United States Patent
Park et al.

(10) Patent No.: US 11,451,421 B2
(45) Date of Patent: Sep. 20, 2022

(54) METHOD AND APPARATUS FOR TRANSMITTING WAKE-UP PACKET IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 543 days.

(21) Appl. No.: 16/494,751

(22) PCT Filed: Mar. 20, 2018

(86) PCT No.: PCT/KR2018/003231
§ 371 (c)(1),
(2) Date: Sep. 16, 2019

(87) PCT Pub. No.: WO2018/174523
PCT Pub. Date: Sep. 27, 2018

(65) Prior Publication Data
US 2020/0106651 A1    Apr. 2, 2020

Related U.S. Application Data

(60) Provisional application No. 62/475,184, filed on Mar. 22, 2017, provisional application No. 62/518,611, (Continued)

(51) Int. Cl.
*H04L 27/02* (2006.01)
*H04L 27/26* (2006.01)
(Continued)

(52) U.S. Cl.
CPC .......... *H04L 27/02* (2013.01); *H04L 27/2607* (2013.01); *H04L 27/2628* (2013.01); *H04W 52/0229* (2013.01); *H04W 84/12* (2013.01)

(58) Field of Classification Search
CPC . H04L 27/02; H04L 27/2613; H04L 27/2602; H04L 27/2607; H04L 27/2628; H04W 84/12
(Continued)

(56) References Cited

U.S. PATENT DOCUMENTS

2011/0287797 A1* 11/2011 Iwai .................. H04L 5/0048
455/509
2013/0336188 A1    12/2013 Yomo et al.
(Continued)

OTHER PUBLICATIONS

PCT International Application No. PCT/KR2018/003231, International Search Report dated Aug. 21, 2018, 6 pages.
(Continued)

*Primary Examiner* — Emmanuel Bayard
(74) *Attorney, Agent, or Firm* — Lee, Hong, Degerman, Kang & Waimey

(57) ABSTRACT

Proposed are a method and an apparatus for transmitting a wake-up frame in a wireless LAN system. Specifically, a transmission apparatus configures a wake-up frame to which an OOK scheme is applied, and transmits the wake-up frame to a reception apparatus. The wake-up frame comprises an on-signal and an off-signal. The on-signal is configured using a signal obtained by masking one-half of a signal obtained by inserting a CP into a first time domain signal. The first time domain signal is generated by inserting coefficients into 13 consecutive subcarriers in a 20 MHz
(Continued)

band and performing 64-point IFFT on the 13 consecutive subcarriers. A signal placed at a front part of the on-signal is nulled.

16 Claims, 16 Drawing Sheets

Related U.S. Application Data filed on Jun. 13, 2017, provisional application No. 62/534,218, filed on Jul. 19, 2017, provisional application No. 62/537,001, filed on Jul. 26, 2017, provisional application No. 62/551,240, filed on Aug. 29, 2017.

(51) Int. Cl.
*H04W 52/02* (2009.01)
*H04W 84/12* (2009.01)

(58) Field of Classification Search
USPC .................................. 375/132, 295, 297, 343
See application file for complete search history.

(56) References Cited

U.S. PATENT DOCUMENTS

| | | | |
|---|---|---|---|
| 2014/0120962 A1* | 5/2014 | Merlin | H04W 68/02 455/466 |
| 2015/0009847 A1* | 1/2015 | Iwai | H04L 25/024 370/252 |
| 2015/0195670 A1* | 7/2015 | Agee | H04J 13/0007 375/144 |
| 2016/0337973 A1 | 11/2016 | Park et al. | |
| 2016/0374018 A1 | 12/2016 | Min et al. | |
| 2018/0019902 A1* | 1/2018 | Suh | H04L 27/2607 |
| 2018/0227070 A1* | 8/2018 | Suh | H04J 13/12 |
| 2018/0263058 A1* | 9/2018 | Yang | H04W 74/0825 |
| 2019/0320303 A1* | 10/2019 | Agee | H04B 1/7103 |

OTHER PUBLICATIONS

Seok, Y. et al., "Coexistence Mechanism for Wakeup Radio Signal", doc.: IEEE 802.11-16/1114r0, Aug. 2016, 12 pages.
Park, M. et al., "LP-WUR (Low-Power Wake-Up Receiver Follow-Up", doc.: IEEE 802.11-16/0341r0, Mar. 2016, 10 pages.

* cited by examiner

FIG. 1
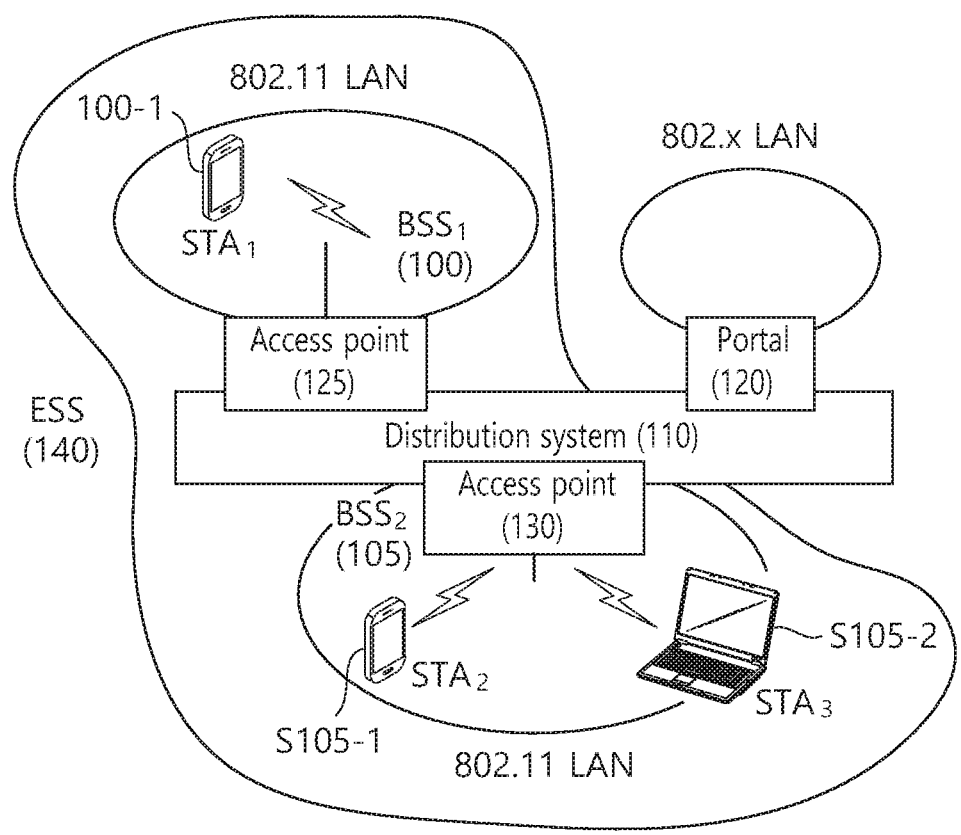
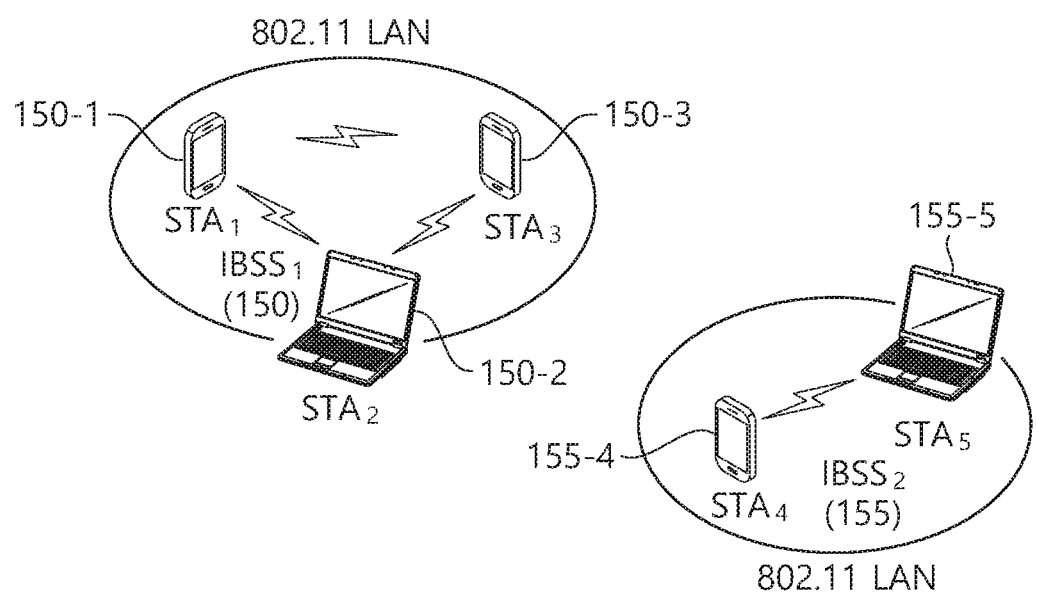

METHOD AND APPARATUS FOR TRANSMITTING WAKE-UP PACKET IN WIRELESS LAN SYSTEM

CROSS-REFERENCE TO RELATED APPLICATIONS

This application is the National Stage filing under 35 U.S.C. 371 of International Application No. PCT/KR2018/003231, filed on Mar. 20, 2018, which claims the benefit of U.S. Provisional Application Nos. 62/475,184, filed on Mar. 22, 2017, 62/518,611, filed on Jun. 13, 2017, 62/534,218, filed on Jul. 19, 2017, 62/537,001, filed on Jul. 26, 2017, and 62/551,240, filed on Aug. 29, 2017, the contents of which are all hereby incorporated by reference herein in their entirety.

BACKGROUND OF THE INVENTION

Field of the Invention

This specification relates to a scheme for performing low-power communication in a wireless LAN system and, more particularly, to a method and apparatus for transmitting a wake-up packet by applying an OOK method in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

This specification proposes a method and apparatus for transmitting a wake-up packet by applying an OOK method in a wireless LAN system.

An example of this specification proposes a method and apparatus for transmitting a wake-up packet in a wireless LAN system.

The present embodiment may operate in a transmitting apparatus. A receiving apparatus may correspond to a low-power wake-up receiver, and the transmitting apparatus may correspond to an AP.

First, terms are defined. An on signal may correspond to a signal having an actual power value. An off signal may correspond to a signal not having an actual power value.

A transmitting apparatus generates a wake-up frame to which an on-off keying (OOK) method is applied.

The transmitting apparatus transmits the wake-up frame to a receiving apparatus.

How the wake-up frame is configured is as follows.

The wake-up frame is configured with an on signal and an off signal.

The on signal is configured with a signal obtained by masking half of a signal in which a cyclic prefix (CP) has been inserted into a first time domain signal. In this case, masking may correspond to a scheme for covering a part of a signal and taking only the remaining some of the signal. Accordingly, the on signal may be configured with a signal obtained by masking the front part of half of a signal in which a CP has been inserted into a first time domain signal or masking the rear part of half of the signal in which a CP has been inserted into the first time domain signal.

The first time domain signal is generated by inserting a coefficient into contiguous 13 subcarriers of a 20 MHz band and performing 64-point inverse fast Fourier transform (IFFT). A coefficient may be inserted into all the 13 subcarriers. In this case, the first time domain signal may be a signal having a length of 3.2 μs not having a period. The coefficient may be selected among 1, −1, j or −j. However, 0 may be inserted into DC.

For another example, a coefficient may be inserted into the 13 subcarriers in a two-subcarrier unit, and 0 may be inserted into the remaining subcarriers. In this case, the first time domain signal may be a 3.2 μs signal having a period of 1.6 μs.

The on signal may be configured by masking the first time domain signal with a signal into which a CP has been inserted. In other words, a 4 μs OOK symbol may be first generated (0.8 μs CP+3.2 μs ON-signal). A 2 μs on signal may be configured by masking half of the 4 μs OOK symbol. The inserted CP may have a length of 0.8 μs. The reason for this is that the 4 μs OOK symbol must be first generated (CP+3.2 μs). The on signal may have a length of 2 μs.

If the transmitting apparatus and the receiving apparatus are located in an indoor channel environment, a signal located at the front part of the on signal may have a length of 0.4 μs.

Furthermore, if the transmitting apparatus and the receiving apparatus are located in an outdoor channel environment, a signal located at the front part of the on signal may have a length of 0.8 μs. That is, the length of a nulled signal necessary depending on a channel environment may be different.

The receiving apparatus can perform decoding using only a signal part (1.6 µs ON-signal or 1.2 µs ON-signal) except a nulled part because a signal located at the front part of the on signal is nulled. Accordingly, inter-symbol interference and intra-symbol interference can be reduced. In terms of power, decoding may be more advantageous.

The off signal may be configured with a signal obtained by masking half of a signal in which a CP has been inserted into a second time domain signal. The second time domain signal may be generated by inserting 0 into contiguous 13 subcarriers of a 20 MHz band and performing 64-point IFFT. The off signal may have a length of 2 µs.

The wake-up frame may include a symbol on which the first information or the second information is transmitted. The first information may be configured in order of the on signal and the off signal. The second information may be configured in order of the off signal and the on signal. On the contrary, the first information may be configured in order of the off signal and the on signal. The second information may be configured in order of the on signal and the off signal. That is, a wake-up frame to which the Manchester coding scheme has been applied may be configured based on signal masking.

The first information or the second information may correspond to logical information transmitted in a symbol unit. For example, the first information may be transmitted through an on symbol, and the second information may be transmitted through an off symbol, and vice versa.

A symbol on which the first information or the second information is transmitted may have a length of 4 µs. The data rate of the symbol on which the first information or the second information is transmitted may be 250 Kbps.

According to an example of this specification, by having a transmitting apparatus transmit a wake-up packet after generating the wake-up packet by applying an OOK modulation method, a receiving apparatus may reduce power consumption using an envelope detector when performing wake-up decoding. Accordingly, the receiving apparatus may decode the wake-up packet with minimum power.

Furthermore, the transmitting apparatus can configure a Manchester coding-based OOK symbol based on signal masking, and can secure a high data rate. Furthermore, the complexity of the transmitting apparatus can be reduced.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
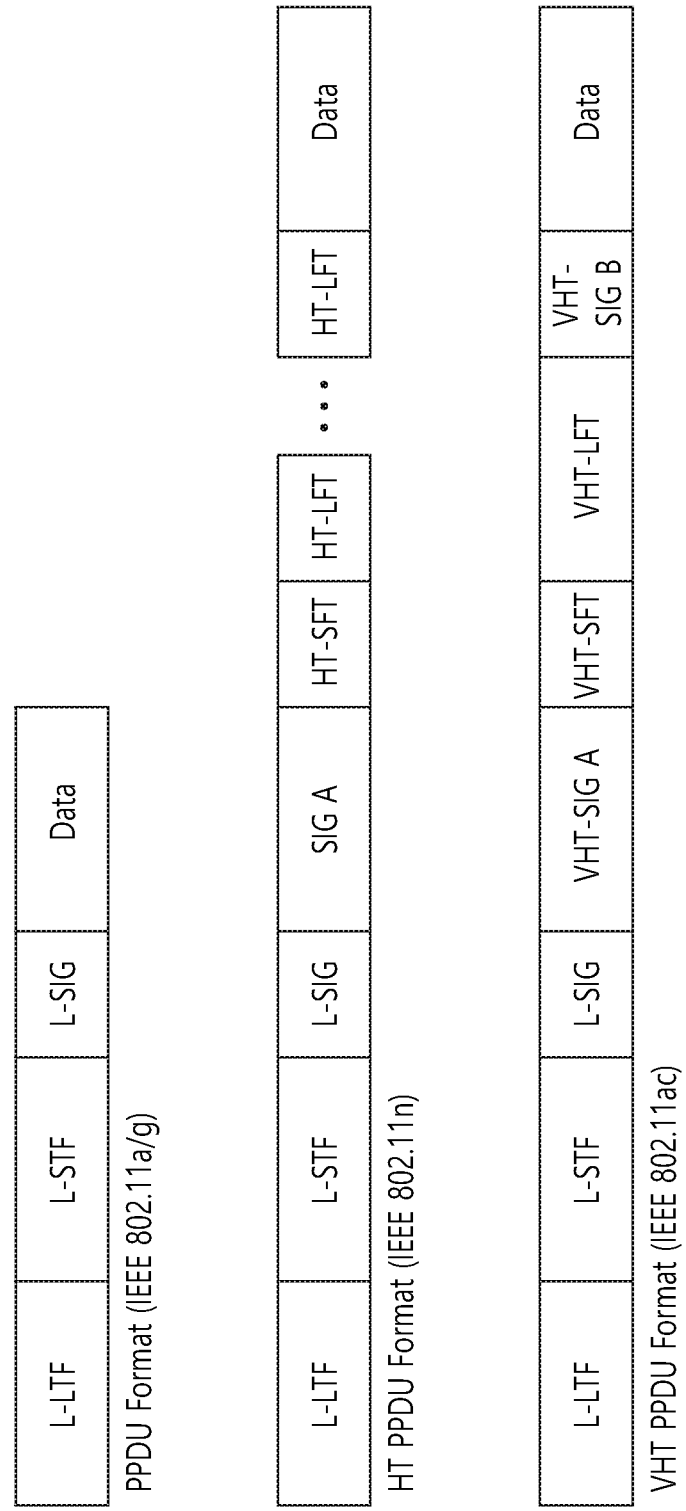
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), a user equipment (UE), a mobile station (MS), a mobile subscriber unit, or simply a user.

The term 'user' may be used in various meanings. For example, the term 'user' may be used to mean a STA participating in uplink MU MIMO and/or uplink OFDMA transmission in wireless LAN communication, but is not limited thereto.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In an embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
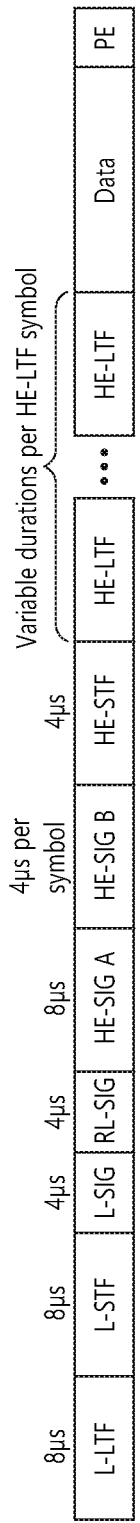
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

A PPDU used in the IEEE standard is described as a PPDU structure being transmitting mainly within a channel bandwidth of 20 MHz. A PPDU structure that is transmitted within a bandwidth (e.g., 40 MHz, 80 MHz) that is wider than the channel bandwidth of 20 MHz may correspond to a structure applying linear scaling of the PPDU structure being used in the channel bandwidth of 20 MHz.

The PPDU used in the IEEE standard is generated based on a 64 Fast Fourier Transform (FFT), and a cyclic prefix (CP) portion may correspond to ¼. In this case, the length of a valid (or effective) symbol section (or FFT section) may be equal to 3.2 us, a CP length may be equal to 0.8 us, and a symbol duration may be equal to 4 us (=3.2 us+0.8 us), which corresponds to/is related with a sum of the length of the valid symbol section and the CP length.

A wireless network is ubiquitous, and the wireless network is generally installed indoors but is also often installed outdoors. The wireless network transmits and receives information using diverse techniques. For example, although the wireless network will not be limited only to this, two of the most broadly supplied techniques that are used for communication correspond to an IEEE 802.11n standard and an IEEE 802.11ac standard, which follow the IEEE 802.11 standard.

The IEEE 802.11 standard designates a common Medium Access Control (MAC) layer, which provides diverse functions for operating the IEEE 802.11 based wireless LAN (WLAN). The MAC layer controls access of shared radio, and, using a protocol that enhances communication through a radio medium, the MAC layer manages and maintains communication between IEEE 802.11 stations (e.g., a wireless network card (NIC) of a personal computer (PC), another wireless device or stations (STA), and an access point (AP)).

As the next new product of the 802.11ac, IEEE 802.11ax was proposed in order to enhance efficiency of a WLAN network, most particularly, in high-density regions, such as public hotspots and other high-traffic regions. Additionally, the IEEE 802.11 may also use orthogonal frequency division multiple access (OFDMA). A High Efficiency WLAN study group (HEW SG) within an IEEE 802.11 Work Group considers an enhancement in spectrum efficiency in order to enhance the system throughput/surface in a high-density scenario of an access point (AP) and/or station (STA).

Although small computing devices, such as wearable devices, sensors, mobile devices, and so on, are restricted due to their compact battery capacity, small computing devices support wireless communication techniques, such as Wi-Fi, Bluetooth®, Bluetooth® Low Energy (BLE), and so on, and, then, the small computing devices should exchange data by being connected to other computing devices, such as smart phones, tablets, personal computers, and so on. Since such communication consumes power, it is important to minimize power consumption of such communication. One of the most ideal strategies for minimizing power consumption is to maintain data transmission and reception without excessively increasing delay (or latency) and to turn off the power for communication blocks as frequently as possible. More specifically, a communication block is transmitted immediately before data reception, and the communication block is turned on only when data that needs to be woken up exists, and, during the rest of the time, the power of the communication block is turned off.

Hereinafter, a low-power wake-up receiver (LP-WUR) will be described in detail.

The communication system (or communication sub-system) that is described in this specification includes a main radio (802.11) and a low-power wake-up receiver.

The main radio is used for the transmission and reception of user data. The main radio is turned off when there is no data or packet that is to be transmitted. The low-power wake-up receiver wakes up the main radio when there is a packet that is to be received. In this case, the user data is transmitted and received by the main radio.

The low-power wake-up receiver is not used (or provided) for user data. The low-power wake-up receiver corresponds to/is related with a receiver for simply waking up a main radio. More specifically, the low-power wake-up receiver does not include a transmitter. The low-power wake-up receiver is activated while the main radio is turned off. During its activated state, the low-power wake-up receiver aims to achieve its target power consumption of less than 1 mW. Additionally, the low-power wake-up receiver uses a narrow band of less than 5 MHz. Furthermore, a target transmission range of the low-power wake-up receiver is the same as a target transmission range of the legacy 802.11.

Figure 4:
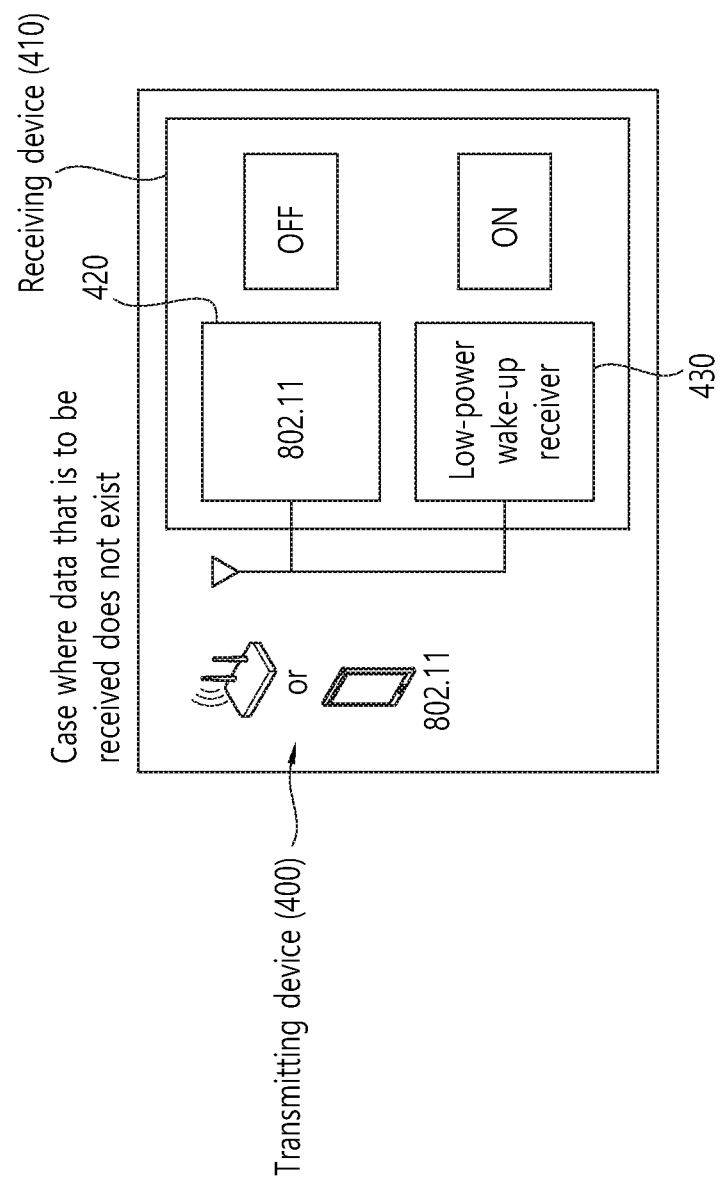
FIG. 4 is a diagram illustrating a low-power wake-up receiver in an environment where data is not received.
Figure 5:
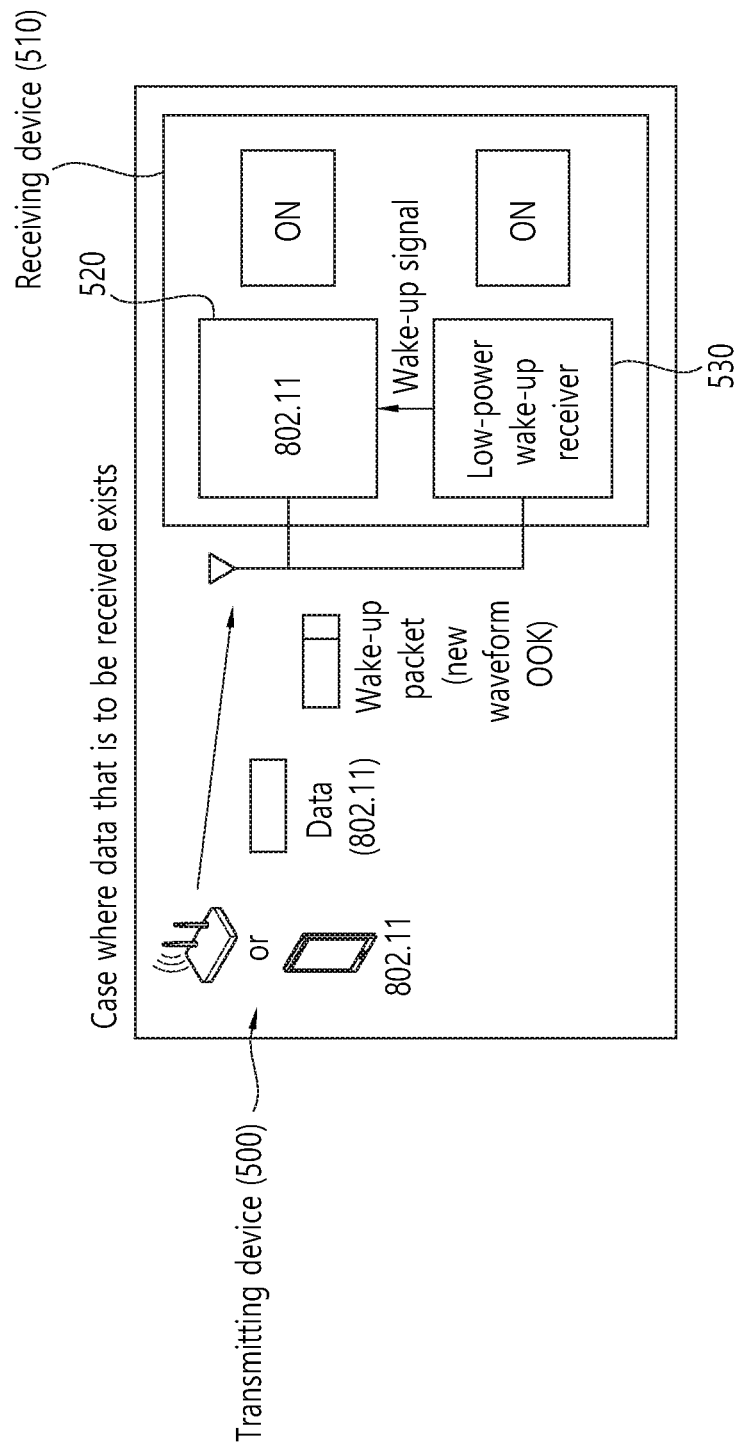
FIG. 5 is a diagram illustrating a low-power wake-up receiver in an environment where data is received.

FIG. 4 is a diagram illustrating a low-power wake-up receiver in an environment where data is not received. FIG. 5 is a diagram illustrating a low-power wake-up receiver in an environment where data is received.

As shown in FIG. 4 and FIG. 5, in case data that is to be transmitted and received exists, one of the methods for implementing the most ideal transmission and reception strategy is to add a low-power wake-up receiver (LP-WUR) that is capable of waking up a main radio, such as Wi-Fi, Bluetooth® radio, Bluetooth® Low Energy (BLE) radio, and so on.

Referring to FIG. 4, the Wi-Fi/BT/BLE radio 420 is turned off, and the low-power wake-up receiver 430 is turned on in a state where data is not received. According to part of the related studies, the power consumption of such low-power wake-up receiver (LP-WUR) may be less than 1 mW.

However, as shown in FIG. 5, if a wake-up packet is received, the low-power wake-up receiver 530 wakes up the entire (or whole) Wi-Fi/BT/BLE radio 520 so that a data packet following the wake-up packet can be accurately received. However, in some cases, actual data or an IEEE 802.11 MAC frame may be included in the wake-up packet. In this case, although the entire Wi-Fi/BT/BLE radio 520 cannot be woken up, the necessary process should be carried out by waking up only part of the Wi-Fi/BT/BLE radio 520. This may result in a considerable amount of power saving.

An exemplary technique that is described in this specification defines a method of a segmented wake-up mode for a Wi-Fi/BT/BLE radio using a low-power wake-up receiver. For example, actual data being included in a wake-up packet may be directly delivered to a memory block without waking up the Wi-Fi/BT/BLE radio.

As another example, in case an IEEE 802.11 MAC frame is included in the wake-up packet, only a MAC processor of the Wi-Fi/BT/BLE wireless device (or radio) needs to be woken up in order to process the IEEE 802.11 MAC frame, which is included in the wake-up packet. More specifically, the power of a PHY module of the Wi-Fi/BT/BLE radio may be turned off or maintained in a low-power mode.

Since a plurality of segmented wake-up modes for a Wi-Fi/BT/BLE radio using a low-power wake-up receiver are defined, when a wake-up packet is received, the power of the Wi-Fi/BT/BLE radio must be turned on. However, according to the exemplary embodiment of this specification, only a necessary (or required) part (or configuration element) of the Wi-Fi/BT/BLE radio may be selectively woken up, thereby saving a larger amount of energy and reducing stand-by (or waiting) time. A large number of solutions using the low-power wake-up receiver wakes up the entire Wi-Fi/BT/BLE radio when receiving a wake-up packet. According to an exemplary aspect that is discussed in this specification, since only a part (or element) of the Wi-Fi/BT/BLE radio that is required for processing the receiving data is woken up, a considerable amount of energy is saved, and unnecessary stand-by (or waiting) time that is needed for waking up the main radio may be reduced.

Additionally, according to this exemplary embodiment, the low-power wake-up receiver 530 may wake up the main radio 520 based on the wake-up packet that is transmitted from a transmitting apparatus 500.

Furthermore, the transmitting apparatus 500 may be configured to transmit the wake-up packet to a receiving apparatus 510. For example, the transmitting apparatus 500 may instruct the low-power wake-up receiver 530 to wake up the main radio 520.

Figure 6:
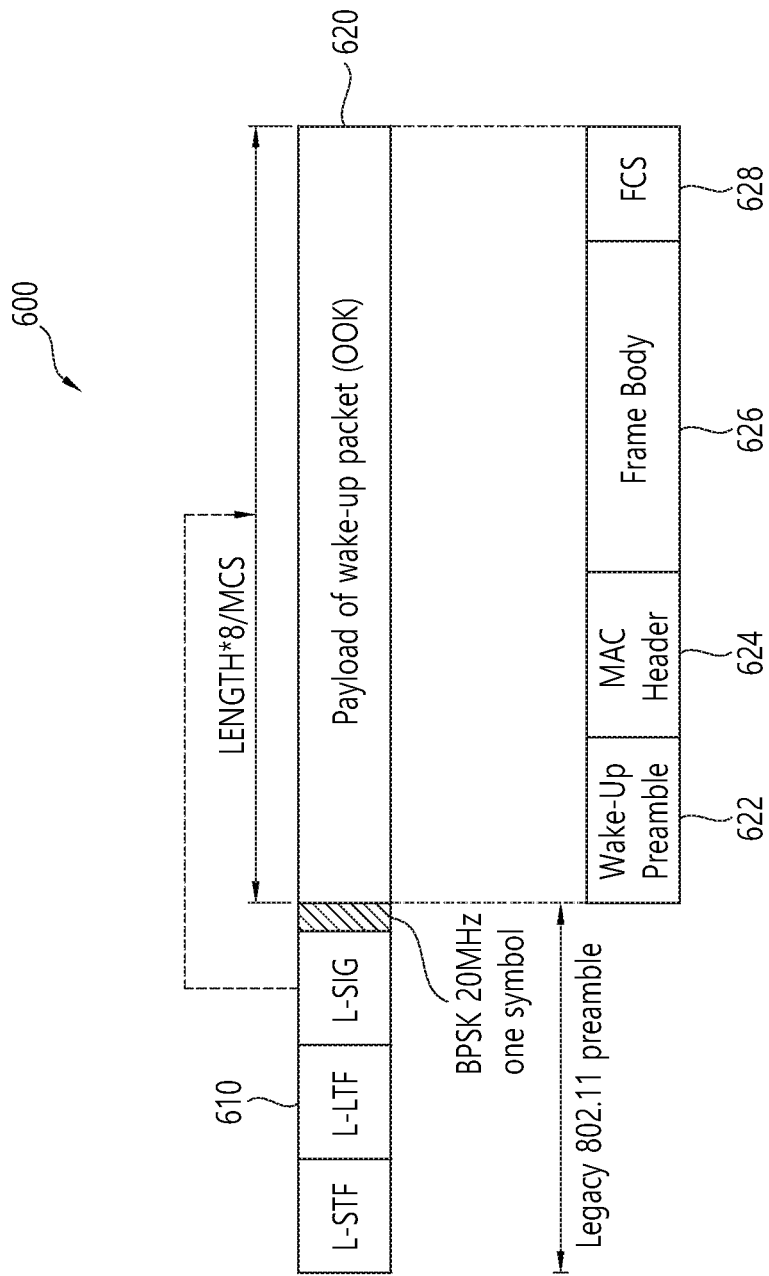
FIG. 6 illustrates an example of a wake-up packet structure according to an exemplary embodiment of this specification.

FIG. 6 illustrates an example of a wake-up packet structure according to an exemplary embodiment of this specification.

A wake-up packet may include one or more legacy preambles. One or more legacy devices may decode or process the legacy preamble(s).

Additionally, the wake-up packet may include a payload after a legacy preamble. The payload may be modulated using a simple modulation scheme, e.g., an On-Off Keying (OOK) scheme.

Referring to FIG. 6, the transmitting apparatus may be configured to generate and/or transmit a wake-up packet 600. Furthermore, the receiving apparatus may be configured to process the received wake-up packet 600.

Additionally, the wake-up packet 600 may include a legacy preamble, which is defined by the IEEE 802.11 specification, or another random preamble 610. Furthermore, the wake-up packet 600 may also include a payload 620.

A legacy preamble provides a coexistence with a legacy STA. The legacy preamble 610 for the coexistence uses an L-SIG field for protecting the packet. Through the L-SIG field within the legacy preamble 610, an 802.11 STA may detect a beginning (or a start point) of the legacy preamble 610. Furthermore, through the L-SIG field within the legacy preamble 610, the 802.11 STA may know (or acknowledge) an end (or last part) of the packet. Additionally, by adding a symbol that is modulated using BPSK after the L-SIG, a false alarm of an 802.11n terminal (or device) may be reduced. A symbol (4 us) that is modulated using BPSK also has a 20 MHz bandwidth, just as the legacy part. The legacy preamble 610 corresponds to/is related with a field for a third party legacy STA (an STA not including an LP-WUR). The legacy preamble 610 is not decoded by the LP-WUR.

The payload 620 may include a wake-up preamble 622. The wake-up preamble 622 may include a sequence of bits that are configured to identify the wake-up packet 600. The wake-up preamble 622 may, for example, include a PN sequence.

Additionally, the payload 620 may include a MAC header 624 including address information of a receiving apparatus, which receives the wake-up packet 600, or an identifier of the receiving apparatus.

Additionally, the payload 620 may include a frame body 626, which may include other information of the wake-up packet. For example, length or size information of the payload may be included in the frame body 626.

Furthermore, the payload 620 may include a frame check sequence (FCS) field 628 including a cyclic redundancy check (CRC) value. For example, the FCS field 628 may include a CRC-8 value or a CRC-16 value of the MAC header 624 and the frame body 626.

Figure 7:
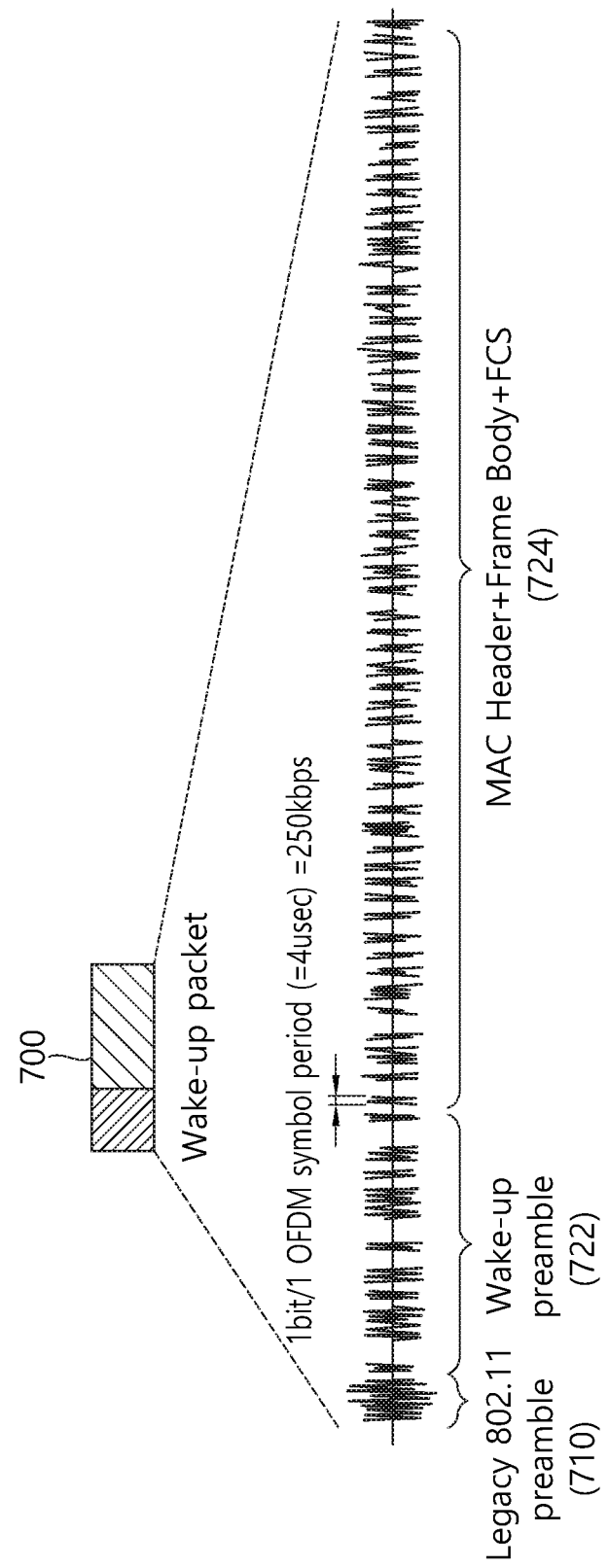
FIG. 7 illustrates a signal waveform of a wake-up packet according to an exemplary embodiment of this specification.

FIG. 7 illustrates a signal waveform of a wake-up packet according to an exemplary embodiment of this specification.

Referring to FIG. 7, a wake-up packet 700 includes a legacy preamble (802.11) preamble 710 and a payload being modulated by OOK. In other words, the wake-up packet 700 is configured of a format in which a legacy preamble and a new LP-WUR signal waveform coexist.

Additionally, the legacy preamble 710 may be modulated in accordance with an OFDM modulation scheme. More specifically, the OOK scheme is not applied to the legacy preamble 710. Conversely, the payload may be modulated in accordance with the OOK scheme. However, a wake-up preamble 722 within the payload may be modulated in accordance with a different modulation scheme.

If the legacy preamble 710 is transmitted within a channel bandwidth of 20 MHz in which 64 FFT is applied, the payload may be transmitted within a channel bandwidth of approximately 4.06 MHz. This will be described in more detail in the following description of an OOK pulse designing method.

Firstly, a modulation method using the OOK scheme and a Manchester coding method will be described in detail.

Figure 8:
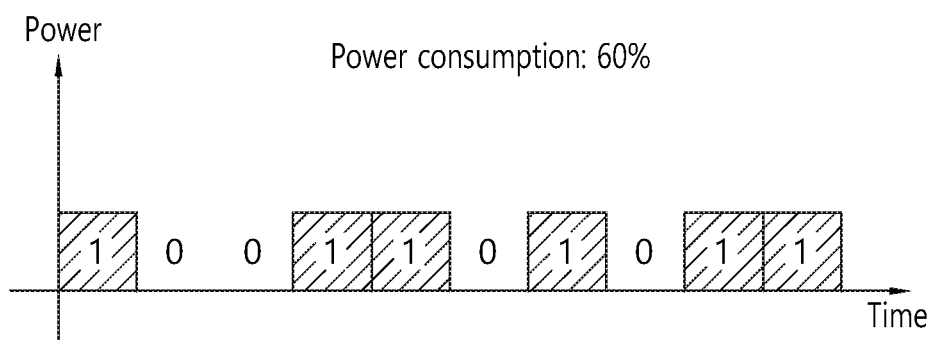
FIG. 8 illustrates a diagram for describing a principle for determining consumed power in accordance with a ratio between bit value 1 and 0 that configure information of a binary sequence format using the OOK scheme.

FIG. 8 illustrates a diagram for describing a principle for determining consumed power in accordance with a ratio between bit value 1 and 0 that configure information of a binary sequence format using the OOK scheme.

Referring to FIG. 8, information of a binary sequence format having 1 or 0 as the bit values is expressed in the drawing. By using such bit values of 1 or 0 of the binary sequence format information, an OOK modulation scheme communication may be carried out. More specifically, by considering the bit values of the binary sequence format information, the OOK modulation scheme communication may be carried out. For example, in case of using a light-emitting diode in visible light communication, in case the bit value configuring the binary sequence format information is equal to 1, the light-emitting diode is turned on, and, in case the bit value is equal to 0, the light-emitting diode is turned off. Thus, the light-emitting diode may be turned on and off (i.e., flicker). As the receiving apparatus receives and recovers the data being transmitted in the form of visible light in accordance with the above-described on and off state (or flickering) of the light-emitting diode, the communication using visible light may be carried out. However, since the flickering of the light-emitting diode cannot be recognized by the human eye, people think and feel that the lighting is continuously maintained in the on state.

For simplicity in the description, as shown in FIG. 8, information of a binary sequence format having 10 bit values is used in this specification. Referring to FIG. 8, information of a binary sequence format having a value of '1001101011'. As described above, in case the bit value is equal to 1, the transmitting apparatus is turned on, and, in case the bit value is equal to 0, the transmitting apparatus is turned off. Accordingly, among the 10 bit values, the symbols are turned on in 6 bit values. In this case, given that 100% of the consumed power is used when all of the symbols are turned on in all of the 10 bit values, and, in case a duty cycle shown in FIG. 8 is followed, the consumed power is 60%.

More specifically, it may be said that the consumed power of the transmitter is determined in accordance with a ratio between 1s and 0s configuring the binary sequence format information. In other words, in case there is a constraint condition specifying that the consumed power of the transmitter should be maintained at a specific value, the ratio between the 1s and 0s configuring the binary sequence format information should also be maintained. For example, in case of a lighting device, since the lighting should be maintained at a specific luminance value that is wanted by the users, the ratio between the 1s and 0s configuring the binary sequence format information should also be maintained accordingly.

However, for the wake-up receiver (WUR), since the receiving apparatus is the subject, the transmission power is not significantly important. One of the main reasons for using the OOK is because the amount of consumed power during the decoding of a received signal is considerably small. Before performing the decoding, the difference between the amount of consumed power in the main radio and in the WUR is small. However, as the decoding process is carried out, the difference in the amount of consumed power becomes apparent. The approximate amount of consumed power is as shown below.

The current Wi-Fi power consumption is approximately 100 mW. More specifically, power may be consumed as follows: Resonator+Oscillator+PLL (1500 uW)→LPF (300 uW)→ADC (63 uW)→decoding processing (OFDM receiver) (100 mW).

However, the WUR power consumption is approximately 1 mW. More specifically, power may be consumed as follows: Resonator+Oscillator (600 uW)→LPF (300 uW)→ADC (20 uW)→decoding processing (Envelope detector) (1 uW).

Figure 9:
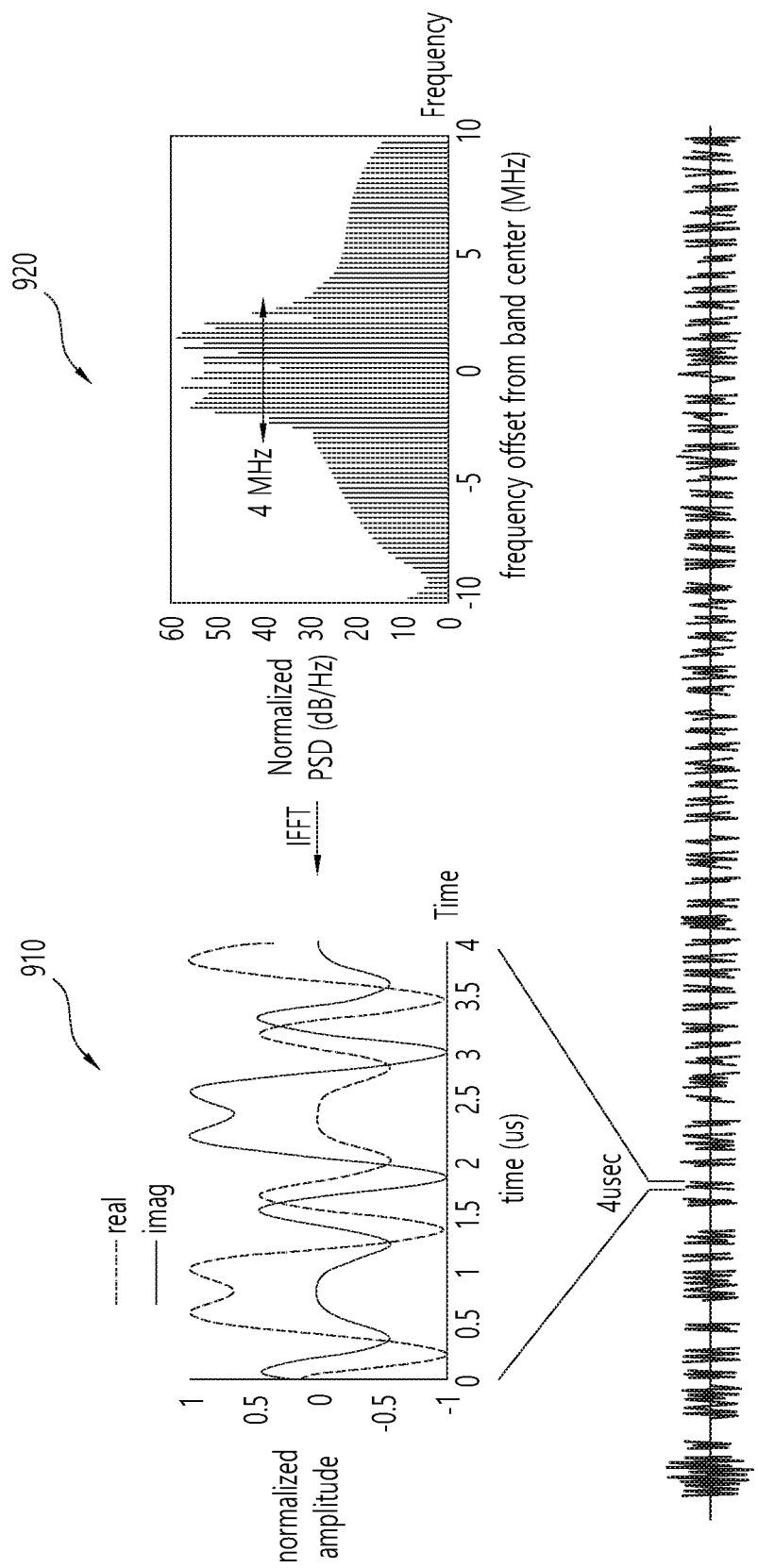
FIG. 9 illustrates a method for designing an OOK pulse according to an exemplary embodiment of this specification.

FIG. 9 illustrates a method for designing an OOK pulse according to an exemplary embodiment of this specification.

In order to generate an OOK pulse, an OFDM transmitting apparatus of 802.11 may be re-used. The transmitting apparatus may generate a sequence having 64 bits by applying 64-point FFT, just as in the legacy 802.11.

The transmitting apparatus should generate the payload of a wake-up packet by performing modulation using the OOK scheme. However, since the wake-up packet is used for low-power communication, the OOK scheme is applied to the ON-signal. Herein, the ON-signal corresponds to/is related with a signal having the actual power value, and an OFF-signal corresponds to/is related with a signal that does not have an actual power value. Although the OOK scheme is also applied to the OFF-signal, since the OFF-signal is not a signal that is generated using the transmitting apparatus, and, accordingly, since the signal is not actually transmitted, the OFF-signal is not considered when generating the wake-up packet.

In the OOK scheme, Information (bit) 1 may correspond to the ON-signal, and Information (bit) 0 may correspond to the OFF-signal. On the other hand, if the Manchester coding method is applied, it may be indicated that Information 1 is shifted from the OFF-signal to the ON-signal, and that Information 0 is shifted from the ON-signal to the OFF-signal. Conversely, it may also be indicated that Information 1 is shifted from the ON-signal to the OFF-signal, and that Information 0 is shifted from the OFF-signal to the ON-signal. The Manchester coding method will be described later on in detail.

Referring to FIG. 9, as shown in the right side frequency domain graph 920, the transmitting apparatus selects 13 consecutive subcarriers of the reference band, 20 MHz band, as a sample and applies a sequence. In FIG. 9, among the subcarriers of the 20 MHz band, the 13 subcarriers that are located in the middle are selected as the sample. More specifically, among the 64 subcarriers, the transmitting apparatus selects subcarriers having subcarrier indexes ranging from −6 to +6. In this case, since subcarrier index 0 is a DC subcarrier, this subcarrier may be nulled as 0. A specific sequence is configured only in the sample of the selected 13 subcarriers, and all of the remaining subcarriers excluding the 13 selected subcarriers (subcarrier indexes ranging from −32 to −7 and subcarrier indexes ranging from +7 to +31) are set to 0.

Additionally, since subcarrier spacing corresponds to/is related to 312.5 KHz, the 13 subcarriers have a channel bandwidth of approximately 4.06 MHz. More specifically, it may be understood that, in the 20 MHz band of the frequency domain, power exists only in 4.06 MHz. Thus, as described above, by focusing the power to the center, it will be advantageous in that a Signal to Noise Ratio (SNR) may be increased, and that power consumption in an AC/DC converter of the receiving apparatus may be reduced. Additionally, since the sampling frequency band is reduced to 4.06 MHz, the amount of the consumed power may be reduced accordingly.

Additionally, as shown in the left time domain graph 910, the transmitting apparatus performs 64-point IFNT on the 13 subcarriers, so as to generate one ON-signal in the time domain. One ON-signal has the size of 1 bit. More specifically, a sequence being configured of 13 subcarriers may correspond to 1 bit. Conversely, the transmitting apparatus may not transmit the OFF-signal at all. By performing IFFT, a symbol of 3.2 us may be generated, and, if a cyclic prefix (CP) (0.8 us) is included, one symbol having the length of 4 us may be generated. More specifically, 1 bit indicating one ON-signal may be loaded in one symbol.

The reason for configuring and transmitting a bit, as described in the above-described exemplary embodiment, is to reduce power consumption in the receiving apparatus using an envelope detector. Thus, the receiving apparatus may decode a packet with a minimum amount of power.

However, a basic data rate for one piece of information may correspond to 125 Kbps (8 us) or 62.5 Kbps (16 us).

By generalizing the description presented above, a signal being transmitted from the frequency domain is as described below. More specifically, each signal having a length of K within the 20 MHz band may be transmitted by being loaded in K number of consecutive subcarriers, among the total of 64 subcarriers. More specifically, as a number of subcarriers being used for transmitting a signal, the value K may correspond to the bandwidth of an OOK pulse. Coefficients of subcarriers other than the K number of subcarriers are equal to 0. In this case, indexes of the K number of subcarriers being used by a signal corresponding to information 0 and information 1 are the same. For example, a subcarrier index that is being used may be indicated as 33−floor(K/2): 33+ceil(K/2)−1.

In this case, Information 1 and Information 0 may have the following values.

Information 0=zeros(1,K)

Information 1=alpha*ones(1,K)

The alpha is a power normalization factor and may, for example, be equal to 1/sqrt(K).

Figure 10:
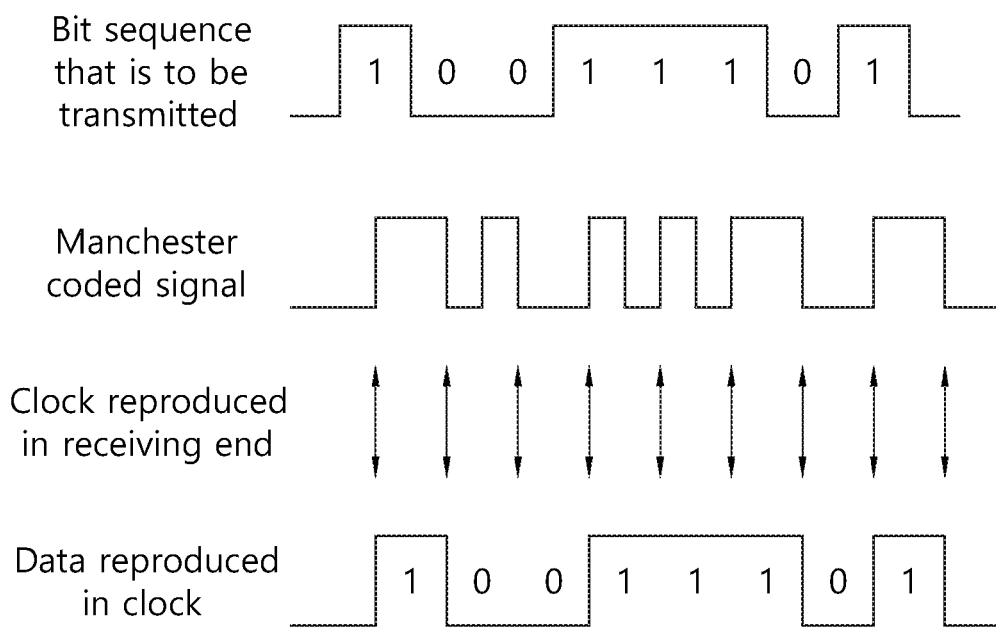
FIG. 10 is a descriptive diagram of a Manchester coding method according to an exemplary embodiment of this specification.

FIG. 10 is a descriptive diagram of a Manchester coding method according to an exemplary embodiment of this specification.

Manchester coding is a type of line coding that corresponds to/is related with a coding method in which a transition in a magnitude value occurs at a midpoint of one bit period. Furthermore, information of this method may be indicated as shown below in the following table.

TABLE 1

| Original data | Clock | | Manchester value |
|---|---|---|---|
| 0 | 0 | XOR | 0 |
|  | 1 |  | 1 |
| 1 | 0 |  | 1 |
|  | 1 |  | 0 |

More specifically, the Manchester coding method (or technique) refers to a method of converting data from 1 to 01 and from 0 to 10 or from 1 to 10 and from 0 to 01. Table 1 shows an example of data being converted from 1 to 10 and from 0 to 01 using Manchester coding.

As shown in FIG. 10, from top to bottom, the drawing illustrates a bit sequence that is to be transmitted, a Manchester coded signal, a clock that is reproduced by the receiving end, and data that is reproduced by the clock.

If data is transmitted from the transmitting end using the Manchester coding method, the receiving end reads the data after a brief moment based on a transition point, wherein transition of 1→0 or 0→1 occurs. Then, after recovering the data and recognizing the transition point of transitioning 1→0 or 0→1 as the transition point of the block, the clock is recovered. Alternatively, when a symbol is divided based on the transition point, a simple decoding may be performed by comparing the power level of the front part of the symbol and the power level of the back part of the symbol based on the midpoint of the symbol.

As shown in FIG. 10, the bit sequence that is to be transmitted corresponds to/is related with 10011101, and the bit sequence that is to be transmitted being processed with Manchester coding corresponds to/is related with 0110100101011001, the clock that is reproduced in the receiving end recognizes a transition point of the Manchester-coded signal as the transition point of the block, and, then, data is recovered using the clock, which is reproduced as described above.

When using the above-described Manchester coding method, communication may be carried out in a synchronization method using only a data transmission channel and without using a separate clock.

Additionally, in the above-described, using only the data transmission channel, a TXD pin may be used for data transmission, and an RXD pin may be used for data reception. Therefore, a synchronized two-way transmission may be performed.

This specification proposes diverse symbol types that can be used in a WUR and the corresponding data rate.

Since STAs requiring robust performance (or capacity) and STAs receiving intense signals from an AP are intermixed, depending upon the situation, supporting an efficient data rate is needed. In order to achieve a reliable and robust performance, a symbol-based Manchester coding method and a symbol repetition method may be used. Additionally, in order to achieve a high data rate, a symbol reduction method may be used.

In this case, each symbol may be generated using the legacy 802.11 OFDM transmitter. Furthermore, the number of subcarriers that are used for generating each symbol may be equal to 13. However, the number of subcarriers will not be limited only to this.

Additionally, each symbol may use OOK modulation, which is configured of an ON-signal and an OFF-signal.

A symbol that is generated for the WUR may be configured of a cyclic prefix (CP) (or a guard interval (GI)) and a signal part indicating actual information. By diversely configuring the lengths of the CP and the actual information signal, or by repeating the CP and the actual information part, a symbol having diverse data rates may be designed.

Diverse example related to the symbol types are shown below.

For example, a basic WUR symbol may be indicated as CP+3.2 us. More specifically, 1 bit is indicated using a symbol having the same length as the legacy Wi-Fi. Most particularly, the transmitting apparatus performs IFFT after applying a specific sequence to all of the subcarriers that are available for usage (e.g., 13 subcarrier), thereby configuring an information signal part of 3.2 us. In this case, among all of the subcarriers that are available for usage, a coefficient of 0 may be loaded in a DC subcarrier or middle subcarrier index.

Different sequence may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. In this case, the CP may correspond to 0.4 us or 0.8 us. This length corresponds to/is related with the same length as the guard interval of 802.11ac.

Therefore, a piece of 1-bit information corresponding to one basic WUR symbol may be indicated as shown below in the following table.

TABLE 2

| Information "0" | Information "1" |
|---|---|
| 3.2 us OFF-signal | 3.2 us ON-signal |

Table 2 does not separately indicate the CP. Actually, when including the CP, CP+3.2 us may indicate one piece of 1-bit information. More specifically, the 3.2 us ON-signal may be regarded as a (CP+3.2 us) ON-signal, and the 3.2 us OFF-signal may be regarded as a (CP+3.2 us) OFF-signal.

For example, a symbol having Manchester coding applied thereto may be indicated as CP+1.6 us+CP+1.6 us or CP+1.6 us+1.6 us. The symbol having Manchester coding applied thereto may be generated as described below.

In an OOK transmission using a Wi-Fi transmitting apparatus, the time period used for transmitting one bit (or symbol) excluding the guard interval of the transmitted signal is equal to 3.2 us. In this case, if Manchester coding is also applied, a shift in the signal size (or magnitude) should occur in 1.6 us. More specifically, each sub-information having a length of 1.6 us should be given a value of 0 or 1, and the corresponding signal may be configured using the method described below.

Information 0→1 0 (Each may be referred to as sub-information 1 0 or sub-symbol 1 (ON) 0 (OFF).)

First 1.6 us (sub-information 1 or sub-symbol 1): Sub-information 1 may be given a value of beta*ones(1,K). Herein, the beta indicates/is related with a power normalization element and may, for example, be equal to 1/sqrt(ceil(K/2)).

Additionally, in order to generate the symbol having Manchester coding applied thereto, a specific sequence is applied to all subcarriers that are available for usage (e.g., 13 subcarriers) in units of 2 spaces. More specifically, each even-number indexed subcarrier of the specific pattern is nulled using 0. For example, when it is assumed that an ON-signal is configured using 13 subcarriers, the specific sequence having a coefficient at an interval of 2 spaces may correspond to {a 0 b 0 c 0 d 0 e 0 f 0 g}, {0 a 0 b 0 c 0 d 0 e 0 f 0}, or {a 0 b 0 c 0 0 0 d 0 e 0 f}. In this case, a, b, c, d, e, f, g may correspond to 1 or −1.

More specifically, among the 64 subcarriers, the transmitting apparatus maps the specific sequence to K number of consecutive subcarriers (e.g., 33−floor(K/2): 33+ceil(K/2)−1) and sets a coefficient of 0 for the remaining subcarriers. Thereafter, the transmitting apparatus performs IFNT. Thus, a time domain signal may be generated. Since the time domain signals has coefficients existing at an interval of 2 spaces within the frequency domain, the time domain signal corresponds to/is related with a 3.2 us-length signal of having a cycle of 1.6 us. One of a first 1.6 us-cycle signal and a second 1.6 us-cycle signal may be selected and used as sub-information 1.

Second 1.6 us (sub-information 0 or sub-symbol 0): Sub-information 0 may be given a value of zeros(1,K). Similarly, among the 64 subcarriers, the transmitting apparatus maps the specific sequence to K number of consecutive subcarriers (e.g., 33−floor(K/2): 33+ceil (K/2)−1) and performs IFFT, thereby generating a time domain signal. Sub-information 0 may correspond to a 1.6 us OFF-signal. The 1.6 us OFF-signal may be generated by setting all of the coefficients to 0.

One of a first 1.6 us-cycle signal and a second 1.6 us-cycle signal of the time domain may be selected and used as sub-information 0. Simply, zero signals (1,32) may also be used as sub-information 0.

Information 1→0 1 (Each may be referred to as sub-information "0", "1" or sub-symbol 0 (OFF) 1 (ON).)

Since Information 1 is also divided into a first 1.6 us (sub-information 0) and a second 1.6 us (sub-information 1), a signal corresponding to each sub-information may be configured using the same method as the method for generating Information 0.

When performing the method for generating Information 0 and Information 1 using Manchester coding, a consecutive occurrence of OFF-symbols may be prevented as compared to the legacy method. Accordingly, a problem of coexistence with the legacy Wi-Fi device does not occur. The problem of coexistence refers to a problem that occurs when another device transmits a signal after determining that the channel is in a channel idle state, due to the existence of consecutive OFF-symbols. If the OOK modulation is only used, the sequence may, for example, correspond to 100001, wherein the OFF-symbol occurs consecutively. However, if Manchester coding is used, the sequence may correspond to 100101010110, wherein the OFF-symbols cannot be consecutive.

According to the description provided above, the sub-information may be referred to as a 1.6 us information signal. The 1.6 us information signal may correspond to a 1.6 us ON-signal or a 1.6 OFF-signal. The 1.6 us ON-signal and the 1.6 OFF-signal may have different sequences applied thereto in each subcarrier.

The CP may select and use a part corresponding having a specific length at an end part of the information signal 1.6 us that immediately follows the CP. In this case, the CP may correspond to 0.4 us or 0.8 us. This length corresponds to/is related with the same length as the guard interval of 802.11ac.

Therefore, a piece of 1-bit information corresponding to a symbol having Manchester coding applied thereto may be indicated as shown below in the following table.

TABLE 3

| Information "0" | Information "1" |
|---|---|
| 1.6 us ON-signal + 1.6 us OFF-signal or 1.6 us OFF-signal + 1.6 us ON-signal | 1.6 us OFF-signal + 1.6 us ON-signal or 1.6 us ON-signal + 1.6 us OFF-signal |

Table 3 does not separately indicate the CP. Actually, when including the CP, CP+1.6 us+CP+1.6 us or CP+1.6 us+1.6 us may indicate one piece of 1-bit information. More specifically, in case of the former structure, the 1.6 us ON-signal and the 1.6 us OFF-signal may be respectively regarded as a (CP+1.6 us) ON-signal and a (CP+1.6 us) OFF-signal.

As yet another example, proposed herein is a method for generating a wake-up packet by repeating symbols in order to enhance performance.

A symbol repetition method is applied to a wake-up payload (724). The symbol repetition method refers to a repetition of time signals after IFFT and cyclic prefix (CP) insertion in each symbol. Thus, the length (time (or duration)) of the wake-up payload (724) becomes two times its initial length.

More specifically, a method for generating a wake-up packet by applying a symbol, which indicates information such as Information 0 or Information 1, to a specific sequence and by repeating this process is proposed as described below.

Option 1: Information 0 and Information 1 may be indicated by being repeated as the same symbol.
Information 0→0 0 (Information 0 is repeated 2 times)
Information 1→1 1 (Information 1 is repeated 2 times)
Option 2: Information 0 and Information 1 may be indicated by being repeated as different symbols.
Information 0→0 1 or 1 0 (Information 0 and Information 1 are repeated)
Information 1→1 0 or 0 1 (Information 1 and Information 0 are repeated)

Hereinafter, a method of decoding a signal, by a receiving apparatus, being transmitted from a transmitting apparatus after applying the symbol repetition method will be described in detail.

The transmitted signal may correspond to a wake-up packet, and a method for decoding the wake-up packet may be broadly divided into two different types. A first type corresponds to a non-coherent detection method, and a second type corresponds to a coherent detection method. The non-coherent detection method refers to a method wherein a phase relation between signals of the transmitting apparatus and the receiving apparatus is not fixed. Therefore, the receiving apparatus is not required to measure and adjust the phase of the received signal. Conversely, in the coherent detection method, the phase between the signals of the transmitting apparatus and the receiving apparatus is required to be matched.

The receiving apparatus includes the above-described low-power wake-up receiver. In order to reduce power consumption, the low-power wake-up receiver may decode a packet (wake-up packet), which is transmitted using the OOK modulation scheme, using an envelope detector.

The envelope detector uses a method of decoding a received signal by measuring the power or magnitude of the corresponding signal. The receiving apparatus determines in advance a threshold value based on the power or magnitude of the received signal, which is measured using the envelope detector. Thereafter, when the receiving apparatus decodes the symbol having OOK applied thereto, if the symbol is greater than or equal to the threshold value, the symbol is determined as Information 1, and, if the symbol is smaller than the threshold value, the symbol is determined as Information 0.

A method for decoding a symbol having the symbol repetition method applied thereto is as described below. In the above-described Option 1, the receiving apparatus may calculate the power corresponding to a case where Symbol 1 (symbol including Information 1) is transmitted using a wake-up preamble 722 and may use the calculated power to determine a threshold value.

More specifically, when an average power level between two symbols is calculated, if the calculated average power level is equal to or greater than the threshold value, the symbol is determined as Information 1 (1 1). Furthermore, if the calculated average power level is equal to or smaller than the threshold value, the symbol is determined as Information 0 (0 0).

Additionally, in Option 2, the information may be determined by comparing the power levels of the two symbols without performing the process of determining the threshold value.

More specifically, when it is given that Information 1 is configured of 0 1 and that Information 0 is configured of 1 0, if the power level of a first symbol is greater than the power level of a second symbol, the information is determined as Information 0. Conversely, if the power level of the first symbol is smaller than the power level of the second symbol, the information is determined as Information 1.

The order of the symbols may be reconfigured by the interleaver. Herein, the interleaver may be applied in packet units and units of a specific number of symbols.

Figure 11:
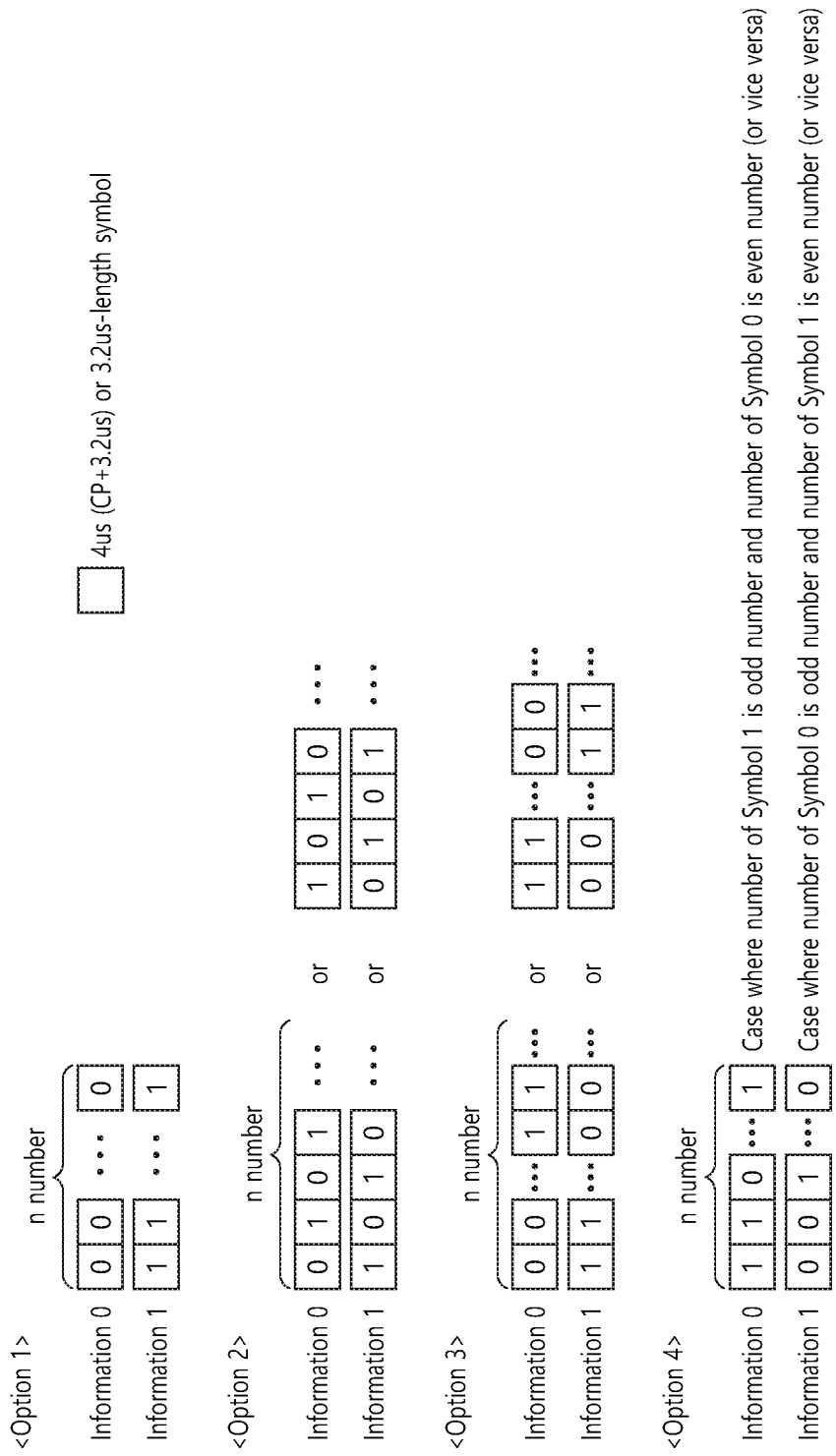
FIG. 11 illustrates various examples of a symbol repetition method repeating n number of symbols according to an exemplary embodiment of this specification.

Moreover, in addition to two symbols, the symbol repetition may be extended using n number of symbols, as described below. FIG. 11 illustrates various examples of a symbol repetition method repeating n number of symbols according to an exemplary embodiment of this specification.

Option 1: As described in FIG. 11, Information 0 and Information 1 may be indicated by being repeated n number of times as the same symbol.
Information 0→0 0 . . . 0 (Information 0 is repeated n number of times)
Information 1→1 1 . . . 1 (Information 1 is repeated n number of times)
Option 2: As described in FIG. 11, Information 0 and Information 1 may be indicated by being repeated n number of times as different symbols.
Information 0→0 1 0 1 . . . or 1 0 1 0 . . . (Information 0 and Information 1 are alternately repeated n number of times)
Information 1→1 0 1 0 . . . or 0 1 0 1 . . . (Information 1 and Information 0 are alternately repeated n number of times)
Option 3: As described in FIG. 11, n number of symbols may be indicated by configuring one half of the symbols of Information 0 and by configuring another half of the symbols of Information 1.
Information 0→0 0 . . . 1 1 . . . or 1 1 . . . 0 0 . . . (n/2 number of symbols is configured of Information 0, and the remaining n number of symbols is configured of Information 1)
Information 1→1 1 . . . 0 0 . . . or 0 0 . . . 1 1 . . . (n/2 number of symbols is configured of Information 0, and the remaining n number of symbols is configured of Information 1)

Option 4: As described in FIG. 11, when n is an odd number, a total of n number of symbols may be indicated by differentiating a number of Symbol 1's (symbol including Information 1) and a number of Symbol 0's (symbols including Information 0) from one another.

Information 0→n number of symbols configured of an odd number of Symbol 1's and an even number of Symbol 0's, or n number of symbols configured of an even number of Symbol 1's and an odd number of Symbol 0's Information 1→n number of symbols configured of an odd number of Symbol 0's and an even number of Symbol 1's, or n number of symbols configured of an even number of Symbol 0's and an odd number of Symbol 1's Additionally, the order of the symbols may be reconfigured by the interleaver. Herein, the interleaver may be applied in packet units and units of a specific number of symbols.

Moreover, as described above, the receiving apparatus may determine the symbol (or information) as Information 0 or Information 1 by determining the threshold value and comparing the power levels of n number of symbols.

However, if consecutive Symbol 0's (or OFF-signals) are used, a problem of coexistence with the legacy Wi-Fi device Hereinafter, various exemplary embodiments of a symbol having the symbol repetition method applied thereto will be described in detail.

In general, a symbol having the symbol repetition method applied thereto may be indicated as n number of (CP+3.2 us) or CP+n number of (1.6 us).

As shown in FIG. 11, 1 bit is indicated using n (n>=2) number of information signals (symbols), and, after applying a specific sequence to all of the subcarriers that are available for usage (e.g., 13 subcarriers), IFFT is performed so as to configure an information signal (symbol) of 3.2 us.

Different sequences may be applied to subcarriers that are available for usage in accordance with a 3.2 us ON-signal and a 3.2 us OFF-signal. The 3.2 us OFF-signal may be generated by applying 0s to all of the coefficients.

A CP may select and use a part corresponding having a specific length at an end part of the information signal 3.2 us that immediately follows the CP. In this case, the CP may correspond to 0.4 us or 0.8 us. This length corresponds to the same length as the guard interval of 802.11ac.

Therefore, a piece of 1-bit information corresponding to a general symbol having the symbol repetition method applied thereto may be indicated as shown below in the following table.

TABLE 4

| Information "0" | Information "1" |
|---|---|
| All 3.2 us OFF-signals or two specific consecutive signals are 3.2 us ON-signal + 3.2 us OFF-signal, and the remaining signals are all ON or all OFF or two specific consecutive signals are 3.2 us OFF-signal + 3.2 us ON-signal, and the remaining signals are all ON or all OFF or a specific number (or ceil(n/2) number or floor(n/2) number) of signals located at specific positions are 3.2 us OFF-signals, and the remaining signals are 3.2 us ON-signals Ex) ON + OFF + ON + OFF . . . | All 3.2 us ON-signals or two specific consecutive signals are 3.2 us OFF-signal + 3.2 us ON-signal, and the remaining signals are all ON or all OFF or two specific consecutive signals are 3.2 us ON-signal + 3.2 us OFF-signal, and the remaining signals are all ON or all OFF or a specific number (or ceil(n/2) number or floor(n/2) number) of signals located at specific positions are 3.2 us ON-signals, and the remaining signals are 3.2 us OFF-signals Ex) OFF + ON + OFF + ON + OFF . . . | and/or another device may occur. The problem of coexistence refers to a problem that occurs when another device transmits a signal after determining that the channel is in a channel idle state, due to the existence of consecutive OFF-symbols. Therefore, in order to resolve the problem of coexistence, since it is preferable to avoid the usage of consecutive OFF-signals, the method proposed in Option 2 may be preferred.

Additionally, this may be extended to a method of expressing m number of information sets using n number of symbols. In this case, the first or last m number of information sets may be indicated as symbols 0 (OFF) or 1 (ON) in accordance with the corresponding information sets, and n-m number of redundant symbols 0 (OFF) or 1 (ON) may be consecutively configured after or before the first or last m number of information sets.

For example, if a code rate of ¾ is applied to information 010, the information may correspond to 1,010 or 010,1 or 0,010 or 010,0. However, in order to prevent the usage of consecutive OFF symbols, it may be preferable to apply a code rate of ½ or less.

Similarly, in this exemplary embodiment, the order of the symbols may be reconfigured by an interleaver. Herein, the interleaver may be applied in packet units and units of a specific number of symbols.

Table 4 does not separately indicate the CP. Actually, when including the CP, n number of (CP+3.2 us) or CP+n number of (3.2 us) may indicate one piece of 1-bit information. More specifically, in case of the n number of (CP+3.2 us), the 3.2 us ON-signal may be regarded as a (CP+3.2 us) ON-signal, and the 3.2 us OFF-signal may be regarded as a (CP+3.2 us) OFF-signal.

As another example, a symbol having the symbol repetition method applied thereto may be indicated as CP+3.2 us+CP+3.2 us or CP+3.2 us+3.2 us.

According to this exemplary embodiment, 1 bit is indicated using two information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. In this case, the CP may correspond to 0.4 us or 0.8 us. This length corresponds to the same length as the guard interval of 802.11ac.

Therefore, a piece of 1-bit information corresponding to a symbol having the symbol repetition method applied thereto may be indicated as shown below in the following table.

TABLE 5

| Information "0" | Information "1" |
|---|---|
| 3.2 us OFF-signal + | 3.2 us ON-signal + |
| 3.2 us OFF-signal | 3.2 us ON-signal |
| or 3.2 us ON-signal + | or 3.2 us OFF-signal + |
| 3.2 us OFF-signal | 3.2 us ON-signal |
| or 3.2 us OFF-signal + | or 3.2 us ON-signal + |
| 3.2 us ON-signal | 3.2 us OFF-signal |

Table 5 does not separately indicate the CP. Actually, when including the CP, CP+3.2 us+CP+3.2 us or CP+3.2 us+3.2 us may indicate one piece of 1-bit information. More specifically, in case of CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us or CP+3.2 us+3.2 us+3.2 us.

According to this exemplary embodiment, 1 bit is indicated using three information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. In this case, the CP may correspond to 0.4 us or 0.8 us. This length corresponds to the same length as the guard interval of 802.11ac.

Therefore, a piece of 1-bit information corresponding to a symbol having the symbol repetition method applied thereto may be indicated as shown below in the following table.

TABLE 6

| Information "0" | Information "1" |
|---|---|
| 3.2 us OFF-signal + | 3.2 us ON-signal + |
| 3.2 us OFF-signal + | 3.2 us ON-signal + |
| 3.2 us OFF-signal | 3.2 us ON-signal |
| or 3.2 us ON-signal + | or 3.2 us ON-signal + |
| 3.2 us ON-signal + | 3.2 us OFF-signal + |
| 3.2 us OFF-signal | 3.2 us ON-signal |
| or 3.2 us ON-signal + | or 3.2 us ON-signal + |
| 3.2 us OFF-signal + | 3.2 us ON-signal + |
| 3.2 us ON-signal | 3.2 us OFF-signal |
| or 3.2 us ON-signal + | or 3.2 us OFF-signal + |
| 3.2 us OFF-signal + | 3.2 us ON-signal + |
| 3.2 us ON-signal | 3.2 us OFF-signal |

Table 6 does not separately indicate the CP. Actually, when including the CP, CP+3.2 us+CP+3.2 us+CP+3.2 us or CP+3.2 us+3.2 us+3.2 us may indicate one piece of 1-bit information. More specifically, in case of CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us+CP+3.2 us or CP+3.2 us+3.2 us+3.2 us+3.2 us.

According to this exemplary embodiment, 1 bit is indicated using four information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. In this case, the CP may correspond to 0.4 us or 0.8 us. This length corresponds to the same length as the guard interval of 802.11ac.

Therefore, a piece of 1-bit information corresponding to a symbol having the symbol repetition method applied thereto may be indicated as shown below in the following table.

TABLE 7

| Information "0" | Information "1" |
|---|---|
| 3.2 us OFF-signal + | 3.2 us ON-signal + |
| 3.2 us OFF-signal + | 3.2 us ON-signal + |
| 3.2 us OFF-signal + | 3.2 us ON-signal + |
| 3.2 us OFF-signal | 3.2 us ON-signal |
| or 3.2 us ON-signal + | or 3.2 us ON-signal + |
| 3.2 us ON-signal + | 3.2 us ON-signal + |
| 3.2 us ON-signal + | 3.2 us OFF-signal + |
| 3.2 us OFF-signal | 3.2 us ON-signal |
| or 3.2 us ON-signal + | or 3.2 us ON-signal + |
| 3.2 us ON-signal + | 3.2 us ON-signal + |
| 3.2 us OFF-signal + | 3.2 us ON-signal + |
| 3.2 us ON-signal | 3.2 us OFF-signal |
| or 3.2 us ON-signal + | or 3.2 us ON-signal + |
| 3.2 us ON-signal + | 3.2 us OFF-signal + |
| 3.2 us OFF-signal + | 3.2 us ON-signal + |
| 3.2 us ON-signal | 3.2 us ON-signal |
| or 3.2 us ON-signal + | or 3.2 us ON-signal + |
| 3.2 us OFF-signal + | 3.2 us ON-signal + |
| 3.2 us ON-signal + | 3.2 us OFF-signal + |
| 3.2 us OFF-signal | 3.2 us ON-signal |
| or 3.2 us ON-signal + | or 3.2 us OFF-signal + |
| 3.2 us OFF-signal + | 3.2 us ON-signal + |
| 3.2 us ON-signal + | 3.2 us OFF-signal + |
| 3.2 us OFF-signal | 3.2 us ON-signal |
| or 3.2 us ON-signal + | or 3.2 us OFF-signal + |
| 3.2 us ON-signal + | 3.2 us OFF-signal + |
| 3.2 us OFF-signal + | 3.2 us ON-signal + |
| 3.2 us OFF-signal | 3.2 us ON-signal |
| or 3.2 us OFF-signal + | or 3.2 us ON-signal + |
| 3.2 us OFF-signal + | 3.2 us ON-signal + |
| 3.2 us ON-signal + | 3.2 us OFF-signal + |
| 3.2 us ON-signal | 3.2 us OFF-signal |

Table 7 does not separately indicate the CP. Actually, when including the CP, CP+3.2 us+CP+3.2 us+CP+3.2 us+CP+3.2 us or CP+3.2 us+3.2 us+3.2 us+3.2 us may indicate one piece of 1-bit information. More specifically, in case of CP+3.2 us+CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having Manchester coding applied thereto may be indicated as n number of (CP+1.6 us+CP+1.6 us) or CP+n number of (1.6 us+1.6 us).

According to this exemplary embodiment, 1 bit is indicated by a symbol that is repeated n (n>=2) number of times, and, after applying a specific sequence to all of the subcarriers that are available for usage (e.g., 13 subcarriers) and setting a coefficient of 0 for the remaining subcarriers, IFFT is performed so as to generate a signal (symbol) of 3.2 us having a cycle of 1.6 us. Herein, one of the configured signals is selected and set (or configured) as a 1.6 us information signal (symbol).

A sub-information may be referred to as a 1.6 us information signal. The 1.6 us information signal may correspond to a 1.6 us ON-signal or a 1.6 us OFF-signal. The 1.6 us ON-signal and the 1.6 us OFF-signal may have different sequences applied thereto in each subcarrier. The 1.6 us OFF-signal may be generated by applying 0s to all of the coefficients.

The CP may select and use a part corresponding having a specific length at an end part of the information signal 1.6 us that immediately follows the CP. In this case, the CP may correspond to 0.4 us or 0.8 us. This length corresponds to the same length as the guard interval of 802.11ac.

Therefore, a piece of 1-bit information corresponding to a symbol having Manchester coding applied thereto based on symbol repetition may be indicated as shown below in the following table.

TABLE 8

| Information "0" | Information "1" |
| --- | --- |
| (1.6 us ON-signal + 1.6 us OFF-signal) is repeated n number of times or (1.6 us OFF-signal + 1.6 us ON-signal) is repeated n number of times | (1.6 us OFF-signal + 1.6 us ON-signal) is repeated n number of times or (1.6 us ON-signal + 1.6 us OFF-signal) is repeated n number of times |
| (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed | (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed |

Table 8 does not separately indicate the CP. Actually, when including the CP, n number of (CP+1.6 us+CP+1.6 us) or CP+n number of (1.6 us+1.6 us) may indicate one piece of 1-bit information. More specifically, in case of the n number of (CP+1.6 us+CP+1.6 us), the 1.6 us ON-signal may be regarded as a (CP+1.6 us) ON-signal, and the 1.6 us OFF-signal may be regarded as a (CP+1.6 us) OFF-signal.

As shown in the above-described exemplary embodiments, using the symbol repetition method, the range requirement of the low-power wake-up communication may be satisfied. In case of applying only the OOK scheme, the data rate for one symbol is 250 Kbps (4 us). In this case, if the symbol is repeated 2 times using the symbol repetition method, the data rate may become 125 Kbps (8 us), and, if the symbol is repeated 4 times, the data rate may become 62.5 Kbps (16 us), and, if the symbol is repeated 8 times, the data rate may become 31.25 Kbps (32 us). In case of the low-power communication, if the BCC does not exist, the symbol should be repeated 8 times in order to satisfy the range requirement.

Hereinafter, various embodiments of a symbol subjected/applied to a symbol reduction scheme among symbol types that can be used for a WUR will be described.

Figure 12:
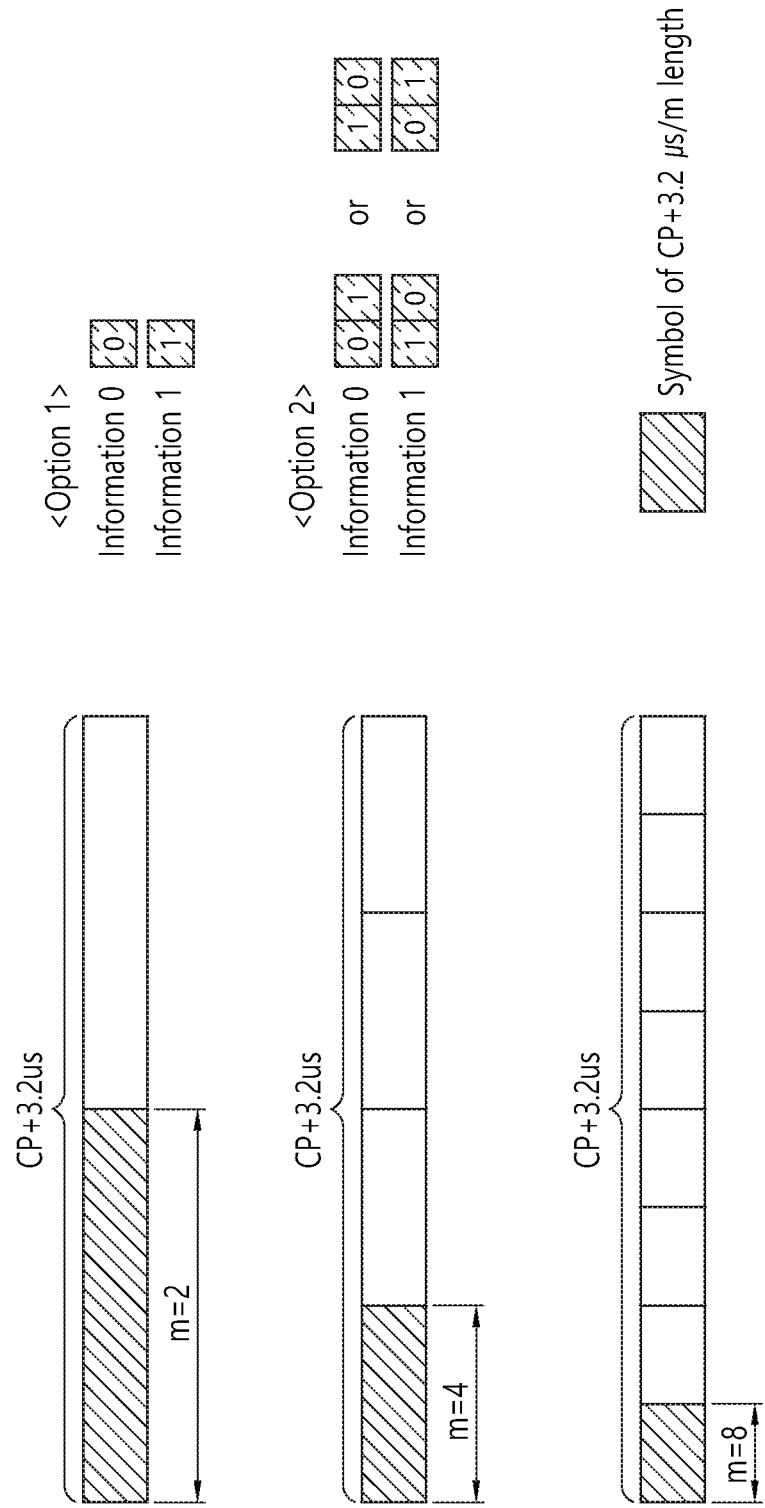
FIG. 12 shows various examples of a symbol reduction scheme according to an embodiment.

FIG. 12 shows various examples of a symbol reduction scheme according to an embodiment.

According to the embodiment of FIG. 12, as m increases, a symbol is reduced, and accordingly the length of a symbol carrying one piece of information is reduced. When m=2, the length of a symbol carrying one piece of information is CP+1.6 us. When m=4, the length of a symbol carrying one piece of information is CP+0.8 us. When m=8, the length of a symbol carrying one piece of information is CP+0.4 us.

The shorter a symbol length is, a higher data rate may be obtained. When only OOK is applied, a data rate for one symbol is 250 Kbps (4 us). In a case where a symbol reduction scheme is applied: when m=2, the data rate may be 500 Kbps (2 us); when m=4, the data rate may be 1 Mbps (1 us); when m=8, the data rate may be 2 Mbps (0.5 us).

For example, a symbol to which a symbol reduction scheme is applied may be represented as CP+3.2 us/m (m=2, 4, 8, 16, 32, . . . ) (Option 1).

As in Option 1 of FIG. 12, one bit is represented using a symbol to which a symbol reduction scheme is applied, a particular sequence is applied to all available subcarriers (for example, 13 subcarriers) by a unit of m subcarriers, and a coefficient of 0 is set for the remaining subcarriers. Then, IFFT is performed on the subcarriers to which the particular sequence is applied, thereby generating 3.2 us signals having a period of 3.2 us/m, one of which is mapped to a 3.2 us/m information signal (information 1).

For example, when a particular sequence is applied to 13 subcarriers by a unit of two subcarriers (m=2), an on signal may be configured as follows.
 On signal (information 1); {a 0 b 0 c 0 d 0 e 0 f 0 g} or {0 a 0 b 0 c 0 d 0 e 0 f 0}, where a, b, c, d, e, f, and g are 1 or −1.

In another example, when a particular sequence is applied to 13 subcarriers by a unit of four subcarriers (m=4), an on signal may be configured as follows.
 On signal (information 1): {a 0 0 0 b 0 0 0 c 0 0 0 d}, {0 a 0 0 0 b 0 0 0 c 0 0 0}, {0 0 a 0 0 0 b 0 0 0 c 0 0}, {0 0 0 a 0 0 0 b 0 0 0 c 0}, or {0 0 a 0 0 0 0 0 0 0 b 0 0}, where a, b, c, and d are 1 or −1.

In still another example, when a particular sequence is applied to 13 subcarriers by a unit of eight subcarriers (m=8), an on signal may be configured as follows.
 On signal (information 1): {a 0 0 0 0 0 0 0 b 0 0 0 0}, {0 a 0 0 0 0 0 0 0 b 0 0 0}, {0 0 a 0 0 0 0 0 0 0 b 0 0}, {0 0 0 a 0 0 0 0 0 0 0 b 0}, or {0 0 0 0 a 0 0 0 0 0 0 0 b}, where a and b is 1 or −1.

A 3.2 us/m information signal is divided into a 3.2 us/m on signal and a 3.2 us/m off signal. Different sequences may be applied to (available) subcarriers for the 3.2 us/m on signal and the 3.2 us/m off signal. The 3.2 us/m off signal may be generated by applying 0 to all coefficients.

A CP may be used by adopting a specified length of the following 3.2 us/m information signal from the back. Here, the CP may be 0.4 us or 0.8 us. This length is the same as the length of a guard interval in 802.11ac. However, when m=8, the CP cannot be 0.8 us. Alternatively, the CP may be 0.1 us or 0.2 us and may be a different value.

Therefore, one-bit information corresponding to a symbol to which a general symbol reduction scheme is applied may be represented as in the following table.

TABLE 9

| Information 0 | Information 1 |
|---|---|
| 3.2 us/m OFF-signal | 3.2 us/m ON-signal |

In Table 9, a CP is not indicated. Actually, CP+3.2 us/m including a CP may indicate one one-bit information. That is, the 3.2 us/m on signal may be considered as a CP+3.2 us/m on signal, and the 3.2 us/m off signal may be considered as a CP+3.2 us/m off signal.

In another example, a symbol to which a symbol reduction scheme is applied may be represented as CP+3.2 us/m+CP+3.2 us/m (m=2, 4, 8) (Option 2).

In OOK transmission using a Wi-Fi transmission device, the time used to transmit one bit (or symbol) excluding a guard interval of a transmission signal is 3.2 us. Here, when a symbol reduction scheme is applied, the time used to transmit one bit is 3.2 us/m. However, in this embodiment, the time used to transmit one bit is set to 3.2 us/m+3.2 us/m by repeating a symbol to which the symbol reduction scheme is applied, and transition in signal size between 3.2 us/m signals is allowed to occur using characteristics of Manchester coding. That is, each piece of sub-information having a length of 3.2 us/m needs to have a value of 0 or 1, and a signal may be configured as follows.

Information 0→1 0 (each may be called sub-information 1 or 0, or sub-symbol 1 (ON) or 0 (OFF))

First 3.2 us/m signal (sub-information 1 or sub-symbol 1): A particular sequence is applied by a unit of m spaces to all subcarriers (for example, 13 subcarriers) available to generate a symbol to which a symbol reduction scheme is applied. That is, the particular sequence may have a coefficient at intervals of m spaces.

The transmission device maps particular sequences to K consecutive subcarriers among 64 subcarriers, sets a coefficient of 0 for the remaining subcarriers, and performs IFFT the subcarriers. Accordingly, a time-domain signal may be generated. Since the time-domain signal has a coefficient at intervals of m spaces in the frequency domain, a 3.2 us signal having a period of 3.2 us/m is generated. One of these signals may be adopted and used as a 3.2 us/m on signal (sub-information 1).

Second 3.2 us/m signal (sub-information 0 or sub-symbol 0): Similarly to the first 3.2 us/m signal, the transmission device may map particular sequences to K consecutive subcarriers among 64 subcarriers and may perform IFFT thereon, thereby generating a time-domain signal. Sub-information 0 may correspond to a 3.2 us/m off signal. The 3.2 us/m off signal may be generated by setting all coefficients to 0.

One of the first and second 3.2 us/m periodic signals of the time-domain signals may be selected and used as sub-information 0.

Information 1→0 1 (each may be called sub-information 0 or 1, or sub-symbol 0 (OFF) or 1 (ON))

Since information 1 is also divided into a first 3.2 us/m signal (sub-information 0) and a second 3.2 us/m signal (sub-information 1), a signal corresponding to each sub-information may be configured in the same manner as used for generating information 0.

Information 0 may be configured as 01, and information 1 may be configured as 10.

As in Option 2 of FIG. 12, one-bit information corresponding to a symbol to which a symbol reduction scheme is applied may be represented as in the following table.

TABLE 10

| Information 0 | Information 1 |
|---|---|
| 3.2 us/m OFF-signal + 3.2 us/m ON-signal or 3.2 us/m ON-signal + 3.2 us/m OFF-signal | 3.2 us/m ON-signal + 3.2 us/m OFF-signal or 3.2 us/m OFF-signal + 3.2 us/m ON-signal |

In Table 10, the CP is not indicated. Actually, CP+3.2 us/m including the CP may indicate one one-bit information. That is, the 3.2 us/m on signal may be considered as a CP+3.2 us/m on signal, and the 3.2 us/m off signal may be considered as a CP+3.2 us/m off signal.

Embodiments of Option 1 and Option 2 in FIG. 12 may be generalized as in the following table.

TABLE 11

| | Information 0 | Information 1 |
|---|---|---|
| Option 1 (m = 2, 4, 8) | 2 us OFF-signal<br>1 us OFF-signal<br>0.5 us OFF-signal | 2 us ON-signal<br>1 us ON-signal<br>0.5 us ON-signal |
| Option 2 (m = 4, 8) | 1 us OFF-signal + 1 us ON-signal or 1 us ON-signal + 1 us OFF-signal<br>0.5 us OFF-signal + 0.5 us ON-signal or 0.5 us ON-signal + 0.5 us OFF-signal | 1 us ON-signal + 1 us OFF-signal or 1 us OFF-signal + 1 us ON-signal<br>0.5 us ON-signal + 0.5 us OFF-signal or 0.5 us OFF-signal + 0.5 us ON-signal |

In Table 11, each signal is represented by a length including a CP. That is, CP+3.2 us/m including a CP may indicate one one-bit information.

For example, when m=4 in Option 2, since the length of a symbol carrying one piece of information is CP+0.8 us, a 1 us off signal or 1 us on signal includes a CP (0.2 us)+0.8 us signal. In Option 2, since Manchester coding is applied, a symbol is repeated. Thus, when m=4, data rate for one piece of information may be 500 Kbps.

In another example, when m=8 in Option 2, since the length of a symbol carrying one piece of information is CP+0.4 us, a 0.5 us off signal or a 0.5 us on signal includes a CP (0.1 us)+0.4 us signal. In Option 2, since Manchester coding is applied, a symbol is repeated. Thus, when m=8, data rate for one piece of information may be 1 Mbps.

The following table shows data rates that can be obtainable through the foregoing embodiments.

TABLE 12

| CP | Default symbol (Embodiment 1) (CP + 3.2 us) | Man. Symbol (Embodiment 2) (CP + 1.6 + CP + 1.6) | Man. Symbol (Embodiment 3) (CP + 1.6 + 1.6) |
|---|---|---|---|
| 0.4 us | 277.8 | 250.0 | 277.8 |
| 0.8 us | 250.0 | 208.3 | 250.0 |

TABLE 13

| | Symbol rep. n (CP + 3.2 us) | | | Symbol rep. CP + n (3.2 us) | | | Man. symbol rep. n (CP + 1.6 us + CP + 1.6 us) | | |
|---|---|---|---|---|---|---|---|---|---|
| CP | n = 2 (Embodiment 4) | n = 3 (Embodiment 5) | n = 4 (Embodiment 6) | n = 2 (Embodiment 7) | n = 3 (Embodiment 8) | n = 4 (Embodiment 9) | n = 2 (Embodiment 10) | n = 3 (Embodiment 11) | n = 4 (Embodiment 12) |
| 0.4 us | 138.9 | 92.6 | 69.4 | 147.1 | 100.0 | 75.8 | 125.0 | 83.3 | 62.5 |
| 0.8 us | 125.0 | 83.3 | 62.5 | 138.9 | 96.2 | 73.5 | 104.2 | 69.4 | 52.1 |

TABLE 14

| | Man. symbol rep. CP + n (1.6 us + 1.6 us) | | | Symbol reduction CP + 3.2 us/m | | |
|---|---|---|---|---|---|---|
| CP | n = 2 (Embodiment 13) | n = 3 (Embodiment 14) | n = 4 (Embodiment 15) | m = 2 (Embodiment 16) | m = 4 (Embodiment 17) | m = 8 (Embodiment 18) |
| 0.4 us | 147.1 | 100.0 | 75.8 | 500.0 | 833.3 | 1250.0 |
| 0.8 us | 138.9 | 96.2 | 73.5 | 416.7 | 625.0 | NA |

TABLE 15

| | Symbol reduction CP + 3.2 us/m | | Man. symbol rep. w/Man. CP + 3.2 us/m + CP + 3.2 us/m | |
|---|---|---|---|---|
| CP | m = 4 | m = 8 | m = 4 | m = 8 |
| 0.1 us | 1111.1 | 2000 | 555.6 | 1000 |
| 0.2 us | 1000 | 1666.7 | 500 | 833.3 |

Furthermore, hereinafter, there is proposed a method of configuring a Manchester coding-based OOK symbol having various data rates in the 802.11ba system. In particular, there is focused on and proposed a method of configuring an ON-signal). The reason why the method is based on Manchester coding is that decoding is simple and coexistence with the existing 802.11 apparatus and apparatuses using other technologies is possible by shortening off duration or off signal duration.

An OOK-based Manchester coding symbol is a symbol in which both an OFF-signal and an ON-signal are present in one symbol as follows and in which transition commonly occurs at the center of a symbol.

TABLE 16

| Information "0" | Information "1" |
|---|---|
| OFF-signal + ON-signal or ON-signal + OFF-signal | ON-signal + OFF-signal or OFF-signal + ON-signal |

Furthermore, if the simple OOK-based Manchester coding symbol of the table is repeated several times, the following results may be obtained.

TABLE 17

| Information "0" | Information "1" |
|---|---|
| OFF-signal + ON-signal + OFF-signal + ON-signal + . . . or ON-signal + OFF-signal + ON-signal + OFF-signal + . . . | ON-signal + OFF-signal + ON-signal + OFF-signal + . . . or OFF-signal + ON-signal + OFF-signal + ON-signal + . . . |

In the above table, the OFF-signal means a signal on which any power is not carried for a specific time. The ON-signal may be generated using a 0.4/0.8/1.6/3.2 μs ON-signal and a CP. Alternatively, a 0.4/0.8/1.6 μs ON-signal and a 0.5/1/2 μs ON-signal may be generated using some duration of a 3.2 μs ON-signal. Alternatively, a 0.4/0.8/1.6 μs ON-signal and a 0.5/1/2 μs ON-signal may be generated using a 0.8 μs CP+some duration of a 3.2 μs ON-signal. Alternatively, ON-signals having various lengths may be generated using a 3.2 μs ON-signal and a 0.8 μs CP+some duration of the 3.2 μs ON-signal. In this case, an optimized signal may be selected as the selected some duration from the viewpoint of the PAPR. To select some duration of a signal means signal masking, and is described later in detail. 0.1/0.2/0.4/0.8 μs may be used as a CP, but is not limited thereto. In the original CP, a signal corresponding to the CP length of a rear part in the existing signal is inserted into the front part of the existing signal. However, in order to reduce interference, any signal may not be inserted into the CP. For example, in a 0.8 μs CP+3.2 μs ON-signal, any signal may not be carried on the 0.8 μs CP.

In this context, a signal may not be carried on a specific length of the front part of a 0.5/1/2 μs ON-signal.

An OOK symbol generated as described above may be used in the wake-up preamble or wake-up payload of a wake-up packet.

A data rate is determined by the length of an OFF-signal or ON-signal, and various examples may be described as follows.

Embodiment 1

TABLE 18

| Information "0" | Information "1" |
|---|---|
| OFF-signal + ON-signal or ON-signal + OFF-signal | ON-signal + OFF-signal or OFF-signal + ON-signal |

In the above table, the OFF-signal may be 4 μs, and the ON-signal may be a 0.8 μs CP+3.2 μs ON-signal. In this case, a data rate is 125 Kbps. A signal may not be inserted into the 0.8 μs CP.

Embodiment 2

TABLE 19

| Information "0" | Information "1" |
|---|---|
| OFF-signal + ON-signal or ON-signal + OFF-signal | ON-signal + OFF-signal or OFF-signal + ON-signal |

In the above table, the OFF-signal may be 2 μsm, and the ON-signal may be a 0.4 μs CP+1.6 μs ON-signal or a 2 μs ON-signal. In this case, a data rate is 250 Kbps. That is, Embodiment 2 may have a high data rate. A signal may not be inserted into the 0.4 μs CP. A signal may not be carried on 0.4 μs of the front part of the 2 μs ON-signal. Alternatively, in order to further reduce inter-symbol interference (ISI), a length having a greater CP may be used. For example, a 0.8 μs CP+1.2 μs ON-signal may be used. The 1.2 μs ON-signal may be generated using a 3.2 μs ON-signal and 0.8 μs CP+some duration of the 3.2 μs ON-signal. A signal may not be inserted into the 0.8 μs CP. Identically, a signal may not be carried on 0.8 μs of the front part of a 2 μs ON-signal.

In general, an X μs CP+(2−X) μs ON-signal may be used. A (2−X) μs ON-signal may be generated using the 3.2 μs ON-signal and 0.8 μs CP+some duration of the 3.2 μs ON-signal. A signal may not be inserted into the X μs CP. Identically, a signal may not be carried on X μs of the front part of a 2 μs ON-signal. If X is greater than 2−X, a signal may not be always inserted.

Embodiment 3

TABLE 20

| Information "0" | Information "1" |
|---|---|
| OFF-signal + ON-signal or ON-signal + OFF-signal | ON-signal + OFF-signal or OFF-signal + ON-signal |

In the above table, the OFF-signal may be 1 μs, and the ON-signal may be a 0.2 μs CP+0.8 μs ON-signal or 1 μs ON-signal. In this case, a data rate is 500 Kbps. That is, Embodiment 3 may have a high data rate. A signal may not be inserted into the 0.2 μs CP. A signal may not be carried on 0.2 μs of the front part of the 1 μs ON-signal. Alternatively, in order to further reduce inter-symbol interference (ISI), a length having a greater CP may be used. For example, a 0.4 μs CP+0.6 μs ON-signal may be used. The 0.6 μs ON-signal may be generated using a 3.2 μs ON-signal and 0.8 μs CP+some duration of the 3.2 μs ON-signal. A signal may not be inserted into the 0.4 μs CP. Identically, a signal may not be carried on 0.4 μs of the front part of a 1 μs ON-signal.

In general, an X μs CP+(1−X) μs ON-signal may be used. An (1−X) μs ON-signal may be generated using a 3.2 μs ON-signal and 0.8 μs CP+some duration of the 3.2 μs ON-signal. A signal may not be inserted into the X μs CP. Identically, a signal may not be carried on X μs of the front part of a μs ON-signal. If X is greater than 1−X, a signal may not be always inserted.

Embodiment 4

TABLE 21

| Information "0" | Information "1" |
|---|---|
| OFF-signal + ON-signal or ON-signal + OFF-signal | ON-signal + OFF-signal or OFF-signal + ON-signal |

In the above table, the OFF-signal may be 0.5 μs. The ON-signal may be a 0.1 μs CP+0.4 μs ON-signal or 0.5 μs ON-signal. In this case, a data rate is 1 Mbps. That is, Embodiment 4 may have a high data rate. A signal may not be inserted into the 0.1 μs CP. A signal may not be carried on 0.1 μs of the front part of the 0.5 μs ON-signal. Alternatively, in order to further reduce inter-symbol interference (ISI), a length having a greater CP may be used. For example, a 0.2 μs CP+0.3 μs ON-signal may be used. The 0.3 μs ON-signal may be generated using a 3.2 μs ON-signal and 0.8 μs CP+some duration of the 3.2 μs ON-signal. A signal may not be inserted into the 0.2 μs CP. Identically, a signal may not be carried on 0.2 μs of the front part of a 0.5 μs ON-signal.

In general, an X μs CP+(0.5−X) μs ON-signal may be used. The (0.5−X) μs ON-signal may be generated using a 3.2 μs ON-signal and 0.8 μs CP+some duration of the 3.2 μs ON-signal. A signal may not be inserted into the X μs CP. Identically, a signal may not be carried on X μs of the front part of the 0.5 μs ON-signal. If X is greater than 0.5−X, a signal may not be always inserted.

Embodiment 5

TABLE 22

| Information "0" | Information "1" |
|---|---|
| OFF-signal + ON-signal + OFF-signal + ON-signal or ON-signal + OFF-signal + ON-signal + OFF-signal OFF-signal + OFF-signal + ON-signal + ON-signal or ON-signal + ON-signal + OFF-signal + OFF-signal | ON-signal + OFF-signal + ON-signal + OFF-signal or OFF-signal + ON-signal + OFF-signal + ON-signal ON-signal + ON-signal + OFF-signal + OFF-signal or OFF-signal + OFF-signal + ON-signal + ON-signal |

In the above table, the OFF-signal may be 4 μs, and the ON-signal may be a 0.8 μs CP+3.2 μs ON-signal. In this case, a data rate is 62.5 Kbps. Embodiment 5 may have a low data rate. A signal may not be inserted into the 0.8 μs CP.

Embodiment 6

TABLE 23

| Information "0" | Information "1" |
|---|---|
| OFF-signal + ON-signal + OFF-signal + ON-signal or ON-signal + OFF-signal + ON-signal + OFF-signal OFF-signal + OFF-signal + ON-signal + ON-signal or ON-signal + ON-signal + OFF-signal + OFF-signal | ON-signal + OFF-signal + ON-signal + OFF-signal or OFF-signal + ON-signal + OFF-signal + ON-signal ON-signal + ON-signal + OFF-signal + OFF-signal or OFF-signal + OFF-signal + ON-signal + ON-signal |

In the above table, the OFF-signal may be 2 μs, and the ON-signal may be a 0.4 μs CP+1.6 μs ON-signal or 2 μs ON-signal. In this case, a data rate is 125 Kbps. A signal may not be inserted into the 0.4 μs CP. A signal may not be carried on 0.4 μs of the front part of the 2 μs ON-signal. Alternatively, in order to further reduce inter-symbol interference (ISI), a length having a greater CP may be used. For example, a 0.8 μs CP+1.2 μs ON-signal may be used. The 1.2 μs ON-signal may be generated using a 3.2 μs ON-signal and 0.8 μs CP+some duration of the 3.2 μs ON-signal. A signal may not be inserted into the 0.8 μs CP. Identically, a signal may not be carried on 0.8 μs of the front part of a 2 μs ON-signal.

In general, an X μs CP+(2−X) μs ON-signal may be used. The (2−X) μs ON-signal may be generated using a 3.2 μs ON-signal and 0.8 μs CP+some duration of the 3.2 μs ON-signal. A signal may not be inserted into the X μs CP. Identically, A signal may not be carried on X μs of the front part of a 2 μs ON-signal. If X is greater than 2−X, a signal may not be always inserted.

Embodiment 7

TABLE 24

| Information "0" | Information "1" |
|---|---|
| OFF-signal + ON-signal + OFF-signal + ON-signal or ON-signal + OFF-signal + ON-signal + OFF-signal OFF-signal + OFF-signal + ON-signal + ON-signal or ON-signal + ON-signal + OFF-signal + OFF-signal | ON-signal + OFF-signal + ON-signal + OFF-signal or OFF-signal + ON-signal + OFF-signal + ON-signal ON-signal + ON-signal + OFF-signal + OFF-signal or OFF-signal + OFF-signal + ON-signal + ON-signal |

In the above table, the OFF-signal may be 1 μs, and the ON-signal may be a 0.2 μs CP+0.8 μs ON-signal or 1 μs ON-signal. In this case, a data rate is 250 Kbps. A signal may not be inserted into the 0.2 μs CP. A signal may not be carried on 0.2 μs of the front part of the 1 μs ON-signal. Alternatively, in order to further reduce inter-symbol interference (ISI), a length having a greater CP may be used. For example, a 0.4 μs CP+0.6 μs ON-signal may be used. The 0.6 μs ON-signal may be generated using a 3.2 μs ON-signal and 0.8 μs CP+some duration of the 3.2 μs ON-signal. A signal may not be inserted into the 0.4 μs CP. Identically, a signal may not be carried on 0.4 μs of the front part of a 1 μs ON-signal.

In general, an X μs CP+(1−X) μs ON-signal may be used. The (1−X) μs ON-signal may be generated using a 3.2 μs ON-signal and 0.8 μs CP+some duration of the 3.2 μs ON-signal. A signal may not be inserted into the X μs CP. Identically, a signal may not be carried on X μs of the front part of a 1 μs ON-signal. If X is greater than 1−X, a signal may not be always inserted.

Embodiment 8

TABLE 25

| Information "0" | Information "1" |
|---|---|
| OFF-signal + ON-signal + OFF-signal + ON-signal or ON-signal + OFF-signal + ON-signal + OFF-signal OFF-signal + OFF-signal + ON-signal + ON-signal or ON-signal + ON-signal + OFF-signal + OFF-signal | ON-signal + OFF-signal + ON-signal + OFF-signal or OFF-signal + ON-signal + OFF-signal + ON-signal ON-signal + ON-signal + OFF-signal + OFF-signal or OFF-signal + OFF-signal + ON-signal + ON-signal |

In this condition, the OFF-signal may be 0.5 μs, and the ON-signal may be a 0.1 μs CP+0.4 μs ON-signal or 0.5 μs ON-signal. In this case, a data rate is 500 Kbps. A signal may not be inserted into the 0.1 μs CP. A signal may not be carried on 0.1 μs of the front part of the 0.5 μs ON-signal. Alternatively, in order to further reduce inter-symbol interference (ISI), a length having a greater CP may be used. For example, a 0.2 μs CP+0.3 μs ON-signal may be used. The 0.3 μs ON-signal may be generated using a 3.2 μs ON-signal and 0.8 μs CP+some duration of a 3.2 μs ON-signal. A signal may not be inserted into the 0.2 μs CP. Identically, a signal may not be carried on 0.2 μs of the front part of a 0.5 μs ON-signal.

In general, an X μs CP+(0.5−X) μs ON-signal may be used. The (0.5−X) μs ON-signal may be generated using a 3.2 μs ON-signal and 0.8 μs CP+some duration of a 3.2 μs ON-signal. A signal may not be inserted into the X μs CP. Identically, a signal may not be carried on X μs of the front part of the 0.5 μs ON-signal. If X is greater than 0.5−X, a signal may not be always inserted.

Embodiment 9

TABLE 26

| Information "0" | Information "1" |
|---|---|
| CP + OFF-signal + ON-signal or CP + ON-signal + OFF-signal | CP + ON-signal + OFF-signal or CP + OFF-signal + ON-signal |

In the above, the CP having a specific length may be fetched from the OFF-signal or ON-signal right after the CP or may be fetched from the last of the entire symbol. For example, a 250-Kbps data rate in which the length of a CP is 0.8 μs and an OFF-signal and ON-signal are 1.6 μs may be taken into consideration. If the CP+OFF-signal+ON-signal of Information "0" is taken into consideration, the last 0.8 μs of the OFF-signal right after the CP may be fetched as a CP signal or the last 0.8 μs (i.e., the last 0.8 μs of the ON-signal) may be fetched as a CP signal. Alternatively, any signal may not be carried on the CP. Various data rates may be obtained by taking into consideration the length of a CP and OFF-signal, ON-signal in various ways. Furthermore, hereinafter, there is proposed a method of nulling a CP when a symbol having a data rate of 62.5 Kbps in the 802.11ba system.

In IEEE 802.11ba, a data rate of 62.5 Kbps may be used. This has a symbol length of a length 16 μs. The symbol of 16 μs may be generated by combining four on-signals and off-signals of 4 μs, and examples thereof are as follows.

62.5 Kbps: 4 μs on-signal+4 μs on-signal+4 μs off-signal+4 μs off signal/4 us off-signal+4 μs off signal+4 μs on-signal+4 μs on-signal 62.5 Kbps: 4 μs on-signal+4 μs off-signal+4 μs on-signal+4 μs off signal/4 us off-signal+4 μs on signal+4 μs off-signal+4 μs on-signal An Off-signal may be configured by not transmitting a signal during 4 μs. An on-signal may be generated as follows. If a subcarrier spacing of a 20 MHz band is 312.5 kHz, the number of subcarriers is 64 (subcarrier indices −32~31). A specific sequence is put on 13 (about 4 MHz) of the 64 subcarriers, and 0 is inserted into the remaining subcarriers. In this case, the 13 subcarriers may use subcarrier indices −6~6. If IFFT is performed on the results, a 3.2 μs signal is formed. A 4 μs on-signal may be configured by adding a CP using the last 0.8 μs of 3.2 μs or without inserting any signal into 0.8 μs. The 4 μs on-signal to which the CP has been added using the last 0.8 μs of 3.2 μs is called a 4 μs on-signal having a CP (4 μs on-signal w/CP). The 4 μs on-signal in which any signal is not inserted into 0.8 μs is called a 4 μs on-signal having a null CP (4 μs on-signal w/null CP). The 4 us on-signal having a null CP may improve performance by focusing power on the 3.2 μs part, and may be less influenced by inter-symbol interference (ISI) and intra-symbol interference (interference within a symbol) by excluding a CP upon decoding.

1) CP is used in all on-signals

A CP may be used in all on-signals as follows.

62.5 Kbps: 4 μs on-signal w/CP+4 μs on-signal w/CP+4 μs off-signal+4 μs off signal/4 μs off-signal+4 μs off signal+4 μs on-signal w/CP+4 μs on-signal w/CP 62.5 Kbps: 4 μs on-signal w/CP+4 μs off-signal+4 μs on-signal w/CP+4 μs off signal/4 μs off-signal+4 μs on signal w/CP+4 μs off-signal+4 μs on-signal w/CP If all on-signals into which a CP has been inserted are used, in terms of power, it may be advantageous to perform decoding using the entire 16 μs signal (i.e., four 4 μs signals). This is a method having the greatest number of samples (or symbols) used upon decoding. However, if the last of a previous symbol is an on-signal, this method may be influenced by ISI and an off-signal may have poor performance due to the influence of intra-symbol interference of a previous on-signal within its symbol.

2) A null CP is used in all on-signals

A null CP may be used in all on-signals as follows.

62.5 Kbps: 4 μs on-signal w/null CP+4 μs on-signal w/null CP+4 μs off-signal+4 us off signal/4 μs off-signal+4 μs off signal+4 μs on-signal w/null CP+4 μs on-signal w/null CP 62.5 Kbps: 4 μs on-signal w/null CP+4 μs off-signal+4 μs on-signal w/null CP+4 μs off signal/4 μs off-signal+4 μs on signal w/null CP+4 μs off-signal+4 μs on-signal w/null CP If on-signals into which a null CP has been inserted are used, in terms of power, it may be advantageous to perform decoding using four 3.2 μs signal parts. This has a small number of symbols used upon decoding compared to Method 1), but may improve performance because ISI and the influence of intra-symbol interference are small.

3) A null CP is used in only some on-signals

In order to increase the number of samples used upon decoding, a null CP may be used in only some on-signals. For example, as follows, a null CP may be used only in the first on-signal (on-signal located at the first position of on-signals).

A first symbol configuration method (62.5 Kbps): 4 μs on-signal w/null CP+4 μs on-signal w/CP+4 μs off-signal+4 μs off signal/4 μs off-signal+4 μs off signal+4 us on-signal w/null CP+4 μs on-signal w/CP A second symbol configuration method (62.5 Kbps): 4 μs on-signal w/null CP+4 us off-signal+4 μs on-signal w/CP+4 μs off signal/4 μs off-signal+4 μs on signal w/null CP+4 μs off-signal+4 μs on-signal w/CP In the first method, a 3.2 μs signal part may be used only in the first and third signals upon decoding (because the 4 μs on-signal w/null CP is used), and the entire 4 μs signal may be used in the second and fourth signals. In the second method, a 3.2 μs signal part may be used only in the first and second signal (because a 4 μs on-signal w/null CP is used), and the entire 4 μs signal may be used in third and fourth signals.

This can reduce ISI compared to Method 1) and can increase the number of samples used upon decoding compared to Method 2). However, the influence of intra-symbol interference may be great compared to Method 2), and thus performance may become poor.

For another example, a null CP may be used only in the second on-signal as follows.

A first symbol configuration method (62.5 Kbps): 4 μs on-signal w/CP+4 μs on-signal w/null CP+4 μs off-signal+4 μs off signal/4 μs off-signal+4 μs off signal+4 us on-signal w/CP+4 μs on-signal w/null CP A second symbol configuration method (62.5 Kbps): 4 μs on-signal w/CP+4 μs off-signal+4 μs on-signal w/null CP+4 μs off signal/4 μs off-signal+4 μs on signal w/CP+4 μs off-signal+4 μs on-signal w/null CP In the first method, a 3.2 μs signal part may be used only in the second and fourth signals upon decoding (because the 4 μs on-signal w/null CP is used), and the entire 4 μs signal may be used in the first and third signals. In the second method, a 3.2 μs signal part may be used only in the third and fourth signals (because the 4 μs on-signal w/null CP), and the entire 4 μs signal may be used in the first and second signals. This can reduce intra-symbol interference compared to Method 1), and can increase the number of samples used upon decoding compared to Method 2). However, the influence of ISI and intra-symbol interference may be great compared to Method 2), and thus performance may become poor.

For another example, a null CP may be used only when the first signal is an on-signal as follows.

A first symbol configuration method (62.5 Kbps): 4 μs on-signal w/null CP+4 μs on-signal w/CP+4 μs off-signal+4 μs off signal/4 μs off-signal+4 μs off signal+4 us on-signal w/CP+4 μs on-signal w/CP A second symbol configuration method (62.5 Kbps): 4 μs on-signal w/null CP+4 μs off-signal+4 μs on-signal w/CP+4 μs off signal/4 μs off-signal+4 μs on signal w/CP+4 μs off-signal+4 μs on-signal w/CP A 3.2 μs signal part may be used only in the first signal upon decoding (because the 4 μs on-signal w/null CP is used), and the entire 4 μs signal may be used in the remaining signals. This can increase the number of samples used upon decoding compared to the two examples of 3) and Method 2). Furthermore, ISI can be reduced compared to Method 1). However, the influence of intra-symbol interference may be great compared to Method 2), and thus performance may become poor.

In all the methods, decoding may be performed using four 4 μs signals. However, this may not be good from the viewpoint of ISI and intra-symbol interference. Furthermore, decoding may be performed using four 3.2 μs signals.

However, if the number of samples used is the smallest and a CP is used, there may be a loss in terms of power. From this point of view, although the number of samples used is the smallest, if a 3.2 μs signal part has the number of samples capable of compensating for a noise factor to some extent, Method 2) having a less influence of ISI and intra-symbol interference and having a small loss in terms of power may be appropriate.

Figure 13:
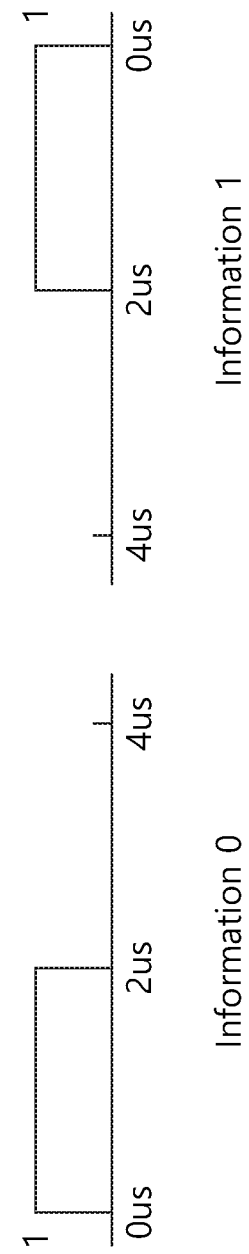
FIG. 13 shows an example in which a 2 µs on signal is configured based on signal masking according to the present embodiment.

FIG. 13 shows an example in which a 2 μs on signal is configured based on signal masking according to the present embodiment.

A data rate can be secured depending on various symbol types which may be used in the WUR. In this case, in order to secure a data rate of 250 Kbps, a method for generating a 2 μs on signal may be proposed. FIG. 13 proposes a masking-based scheme using a sequence of a length 13 (a coefficient has been inserted into all contiguous 13 subcarriers of a 20 MHz band).

Referring to FIG. 13, in the case of a masking-based approach method, first, a 4 μs OOK symbol may be generated. 64-point IFFT is performed by applying a sequence of a length 13 to contiguous 13 subcarriers of a 20 MHz band. A 4 μs OOK symbol is generated by adding a 0.8 μs CP or GI. Furthermore, a 2 μs on signal may be configured by masking half of the 4 μs OOK symbol.

For example, referring to FIG. 13, in information 0, a 2 μs on signal may be configured by taking a front part, that is, half of a 4 μs symbol. A 2 μs off signal may be configured by not transmitting any information in a rear part, that is, half of the 4 μs symbol. Furthermore, in information 1, a 2 μs on signal may be configured by taking a rear part, that is, half of a 4 μs symbol. A 2 μs off signal may be configured by not transmitting any information in a front part, that is, half of the 4 μs symbol.

Figure 14:
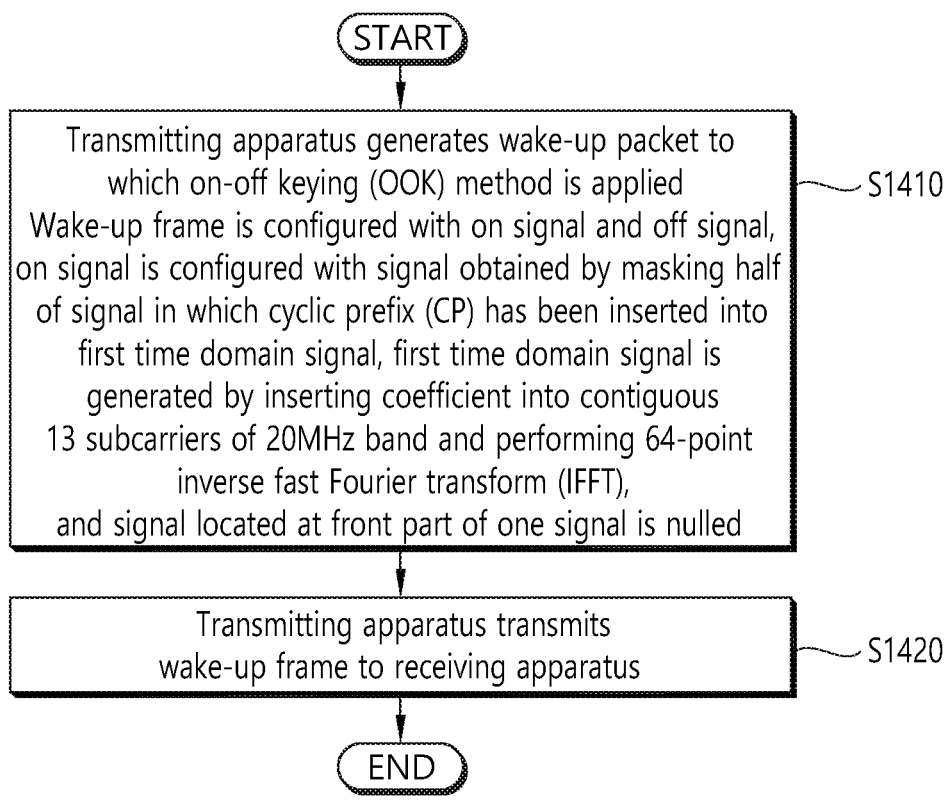
FIG. 14 is a flowchart illustrating a procedure of transmitting a wake-up frame by applying an OOK method according to the present embodiment.

FIG. 14 is a flowchart illustrating a procedure of transmitting a wake-up frame by applying an OOK method according to the present embodiment.

The example of FIG. 14 may be performed in a transmitting apparatus. A receiving apparatus may correspond to a low-power wake-up receiver. The transmitting apparatus may correspond to an AP.

Terms are first arranged. An on signal may correspond to a signal having an actual power value. An off signal may correspond to a signal not having an actual power value.

At step S1410, the transmitting apparatus generates a wake-up packet to which an on-off keying (OOK) method is applied.

At step S1420, the transmitting apparatus transmits the wake-up frame to the receiving apparatus.

How the wake-up frame is configured is described below.

The wake-up frame is configured with an on signal and an off signal.

The on signal is configured with a signal obtained by masking half of a signal in which a cyclic prefix (CP) has been inserted into a first time domain signal. In this case, masking may correspond to a scheme for covering a part of a signal and taking only the remaining some of the signal. Accordingly, the on signal may be configured with a signal obtained by masking the front part of half of a signal in which a CP has been inserted into a first time domain signal or masking the rear part of half of the signal in which a CP has been inserted into the first time domain signal.

The first time domain signal is generated by inserting a coefficient into contiguous 13 subcarriers of a 20 MHz band and performing 64-point inverse fast Fourier transform (IFFT). A coefficient may be inserted into all the 13 subcarriers. In this case, the first time domain signal may be a signal having a length of 3.2 μs not having a period. The coefficient may be selected among 1, −1, j or −j. However, 0 may be inserted into DC.

For another example, a coefficient may be inserted into the 13 subcarriers in a two-subcarrier unit, and 0 may be inserted into the remaining subcarriers. In this case, the first time domain signal may be a 3.2 μs signal having a period of 1.6 μs.

The on signal may be configured by masking the first time domain signal with a signal into which a CP has been inserted. In other words, a 4 μs OOK symbol may be first generated (0.8 μs CP+3.2 μs ON-signal). A 2 μs on signal may be configured by masking half of the 4 μs OOK symbol. The inserted CP may have a length of 0.8 μs. The reason for this is that the 4 μs OOK symbol must be first generated (CP+3.2 μs). The on signal may have a length of 2 μs.

If the transmitting apparatus and the receiving apparatus are located in an indoor channel environment, a signal located at the front part of the on signal may have a length of 0.4 μs.

Furthermore, if the transmitting apparatus and the receiving apparatus are located in an outdoor channel environment, a signal located at the front part of the on signal may have a length of 0.8 μs. That is, the length of a nulled signal necessary depending on a channel environment may be different.

The receiving apparatus can perform decoding using only a signal part (1.6 μs ON-signal or 1.2 μs ON-signal) except a nulled part because a signal located at the front part of the on signal is nulled. Accordingly, inter-symbol interference and intra-symbol interference can be reduced. In terms of power, decoding may be more advantageous.

The off signal may be configured with a signal obtained by masking half of a signal in which a CP has been inserted into a second time domain signal. The second time domain signal may be generated by inserting 0 into contiguous 13 subcarriers of a 20 MHz band and performing 64-point IFFT. The off signal may have a length of 2 μs.

The wake-up frame may include a symbol on which the first information or the second information is transmitted. The first information may be configured in order of the on signal and the off signal. The second information may be configured in order of the off signal and the on signal. On the contrary, the first information may be configured in order of the off signal and the on signal. The second information may be configured in order of the on signal and the off signal. That is, a wake-up frame to which the Manchester coding scheme has been applied may be configured based on signal masking.

The first information or the second information may correspond to logical information transmitted in a symbol unit. For example, the first information may be transmitted through an on symbol, and the second information may be transmitted through an off symbol, and vice versa.

A symbol on which the first information or the second information is transmitted may have a length of 4 μs. The data rate of the symbol on which the first information or the second information is transmitted may be 250 Kbps.

Furthermore, the transmitting apparatus may be first aware of power values of an on signal and off signal, and may configure the on signal and the off signal. The receiving apparatus can reduce power consumed upon decoding by decoding an on signal and an off signal using an envelope detector.

Figure 15:
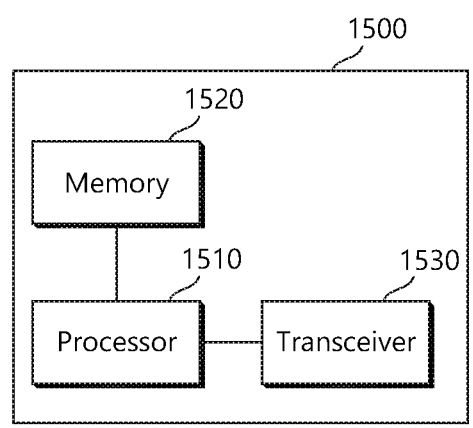
FIG. 15 is a block view illustrating a wireless device to which the exemplary embodiment of the present invention can be applied.

FIG. 15 is a block view illustrating a wireless device to which the exemplary embodiment of the present invention can be applied.

Referring to FIG. 15, as an STA that can implement the above-described exemplary embodiment, the wireless device may correspond to an AP or a non-AP station (STA). The wireless device may correspond to the above-described user or may correspond to a transmission device transmitting a signal to the user.

The wireless apparatus of FIG. 15, as shown, includes a processor 1510, a memory 1520 and a transceiver 1530. The illustrated processor 1510, memory 1520 and transceiver 1530 may be implemented as separate chips, respectively, or at least two blocks/functions may be implemented through a single chip.

The transceiver 1530 is a device including a transmitter and a receiver. If a specific operation is performed, only an operation of any one of the transmitter and the receiver may be performed or operations of both the transmitter and the receiver may be performed. The transceiver 1530 may include one or more antennas for transmitting and/or receiving a radio signal. Furthermore, the transceiver 1530 may include an amplifier for amplifying a received signal and/or a transmission signal and a bandpass filter for transmission on a specific frequency band.

The processor 1510 may implement the functions, processes and/or methods proposed in this specification. For example, the processor 1510 may perform the above-described operations according to the present embodiment. That is, processor 1510 may perform the operations disclosed in the embodiments of FIGS. 1 to 14.

The processor 1510 may include application-specific integrated circuits (ASIC), other chipsets, logic circuits, data processors and/or a converter for converting a baseband signal into a radio signal, and vice versa. The memory 1520 may include a read-only memory (ROM), a random access memory (RAM), a flash memory, a memory card, a storage medium and/or other storage devices.

Figure 16:
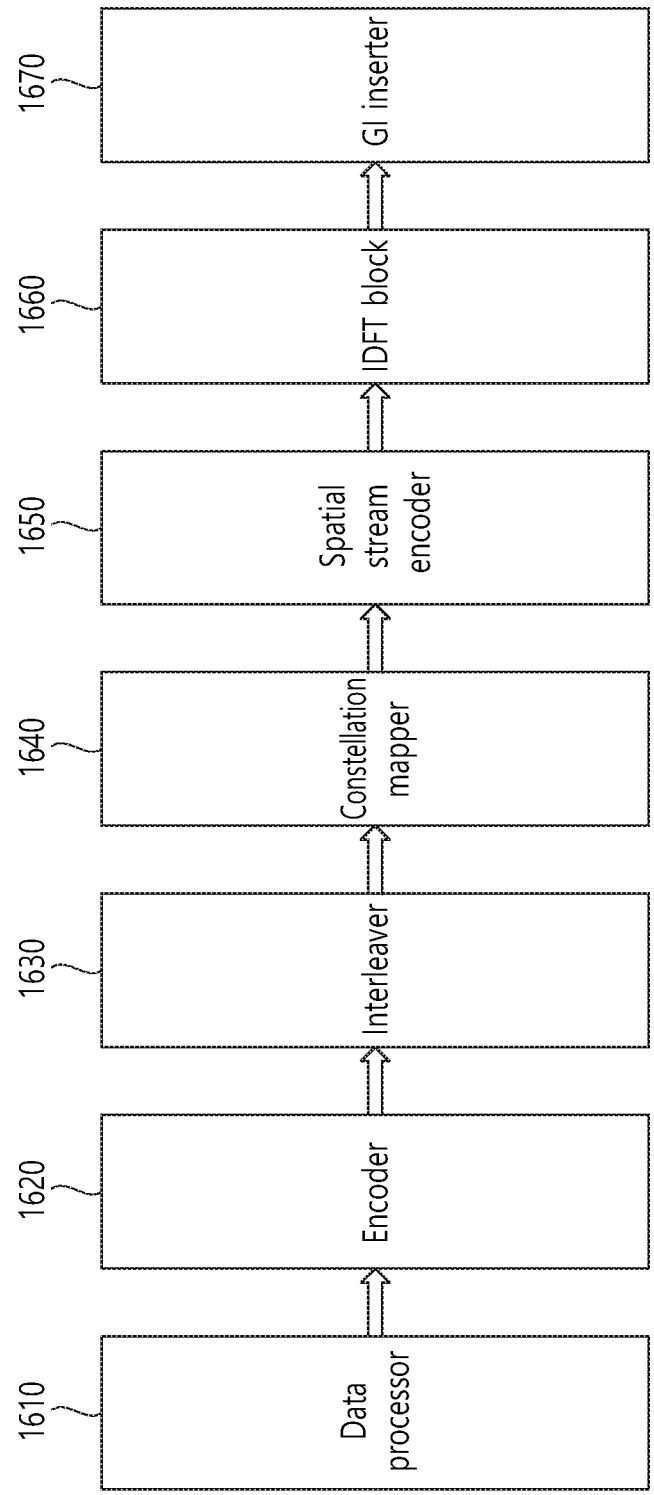
FIG. 16 is a block diagram illustrating an example of an apparatus included in a processor.

FIG. 16 is a block diagram illustrating an example of an apparatus included in a processor. For convenience of description, the example of FIG. 16 has been described based on blocks for a transmission signal, but it is evident that a received signal can be processed using the corresponding blocks.

An illustrated data processor 1610 generates transmission data (control data and/or user data) corresponding to a transmission signal. The output of the data processor 1610 may be input to an encoder 1620. The encoder 1620 may perform coding through a binary convolutional code (BCC) or a low-density parity-check (LDPC) scheme. At least one encoder 1620 may be included. The number of encoders 1620 may be determined depending on various pieces of information (e.g., the number of data streams).

The output of the encoder 1620 may be input to an interleaver 1630. The interleaver 1630 performs an operation of distributing contiguous bit signals on a radio resource (e.g., time and/or frequency) in order to prevent a burst error attributable to fading. At least one interleaver 1630 may be included. The number of interleavers 1630 may be determined depending on various pieces of information (e.g., the number of spatial streams).

The output of the interleaver 1630 may be input to a constellation mapper 1640. The constellation mapper 1640 performs constellation mapping, such as biphase shift keying (BPSK), quadrature phase shift keying (QPSK), or quadrature amplitude modulation (n-QAM).

The output of the constellation mapper 1640 may be input to a spatial stream encoder 1650. The spatial stream encoder 1650 performs data processing in order to transmit a transmission signal through at least one spatial stream. For example, the spatial stream encoder 1650 may perform at least one of space-time block coding (STBC), cyclic shift diversity (CSD) insertion and spatial mapping on a transmission signal.

The output of the spatial stream encoder 1650 may be input to an IDFT block 1660. The IDFT block 1660 performs inverse discrete Fourier transform (IDFT) or inverse Fast Fourier transform (IFFT).

The output of the IDFT block 1660 is input to a guard interval (GI) inserter 1670. The output of the GI inserter 1670 is input to the transceiver 1530 of FIG. 15.

What is claimed is:

1. A method of transmitting a wake-up frame in a wireless LAN system, the method comprising:
generating, by a transmitting apparatus, a wake-up frame to which an on-off keying (OOK) method is applied; and
transmitting, by the transmitting apparatus, the wake-up frame to a receiving apparatus,
wherein the wake-up frame is configured with an on signal and an off signal,
the on signal is configured with a signal obtained by masking half of a signal in which a cyclic prefix (CP) has been inserted into a first time domain signal,
the first time domain signal is generated by inserting a coefficient into contiguous 13 subcarriers of a 20 MHz band and performing 64-point inverse fast Fourier transform (IFFT), and
a signal located at a front part of the on signal is nulled.

2. The method of claim 1, wherein:
the signal in which the CP has been inserted into the first time domain signal has a length of 4 µs, and
the on signal has a length of 2 µs.

3. The method of claim 2, wherein if the transmitting apparatus and the receiving apparatus are located in an indoor channel environment, the signal located at the front part of the on signal has a length of 0.4 µs.

4. The method of claim 2, wherein if the transmitting apparatus and the receiving apparatus are located in an outdoor channel environment, the signal located at the front part of the on signal has a length of 0.8 µs.

5. The method of claim 1, wherein:
the off signal is configured with a signal obtained by masking half of a signal in which a CP has been inserted into a second time domain signal,
the second time domain signal is generated by inserting 0 into contiguous 13 subcarriers of a 20 MHz band and performing 64-point IFFT, and
the off signal has a length of 2 µs.

6. The method of claim 5, wherein:
the wake-up frame comprises a symbol on which first information or second information is transmitted,
the first information is configured in order of the on signal and the off signal,
the second information is configured in order of the off signal and the on signal, and
the symbol on which the first information or the second information is transmitted has a length of 4 µs.

7. The method of claim 6, wherein a data rate of the symbol on which the first information or the second information is 250 Kbps.

8. The method of claim 1, wherein:
the coefficient has been inserted into all the 13 subcarriers, and
the first time domain signal is a signal having a length of 3.2 µs not having a period.

9. A transmitting apparatus transmitting a wake-up frame in a wireless LAN system, the apparatus comprising:
- a transceiver transmitting or receiving a radio signal; and
- a processor configured to control the transceiver, wherein the processor is configured to:
- generate a wake-up frame to which an on-off keying (OOK) method is applied; and
- transmit the wake-up frame to a receiving apparatus,
- wherein the wake-up frame is configured with an on signal and an off signal,
- the on signal is configured with a signal obtained by masking half of a signal in which a cyclic prefix (CP) has been inserted into a first time domain signal,
- the first time domain signal is generated by inserting a coefficient into contiguous 13 subcarriers of a 20 MHz band and performing 64-point inverse fast Fourier transform (IFFT), and
- a signal located at a front part of the on signal is nulled.

10. The transmitting apparatus of claim 9, wherein:
- the signal in which the CP has been inserted into the first time domain signal has a length of 4 µs, and
- the on signal has a length of 2 µs.

11. The transmitting apparatus of claim 10, wherein if the transmitting apparatus and the receiving apparatus are located in an indoor channel environment, the signal located at the front part of the on signal has a length of 0.4 µs.

12. The transmitting apparatus of claim 10, wherein if the transmitting apparatus and the receiving apparatus are located in an outdoor channel environment, the signal located at the front part of the on signal has a length of 0.8 µs.

13. The transmitting apparatus of claim 9, wherein:
- the off signal is configured with a signal obtained by masking half of a signal in which a CP has been inserted into a second time domain signal,
- the second time domain signal is generated by inserting 0 into contiguous 13 subcarriers of a 20 MHz band and performing 64-point IFFT, and
- the off signal has a length of 2 µs.

14. The transmitting apparatus of claim 13, wherein:
- the wake-up frame comprises a symbol on which first information or second information is transmitted,
- the first information is configured in order of the on signal and the off signal,
- the second information is configured in order of the off signal and the on signal, and
- the symbol on which the first information or the second information is transmitted has a length of 4 µs.

15. The transmitting apparatus of claim 14, wherein a data rate of the symbol on which the first information or the second information is 250 Kbps.

16. The transmitting apparatus of claim 9, wherein:
- the coefficient has been inserted into all the 13 subcarriers, and
- the first time domain signal is a signal having a length of 3.2 µs not having a period.

* * * * *